United States Patent
Swansey et al.

(10) Patent No.: US 11,169,773 B2
(45) Date of Patent: Nov. 9, 2021

(54) SYSTEMS, METHODS, AND APPARATUSES FOR AGRICULTURAL DATA COLLECTION, ANALYSIS, AND MANAGEMENT VIA A MOBILE DEVICE

(71) Applicant: TekWear, LLC, Norcorss, GA (US)

(72) Inventors: John David Swansey, Durham, NC (US); Bruce Wayne Rasa, Buford, GA (US); Bruce Balentine, Eugene, OR (US); Erick Christian Kobres, Lawrenceville, GA (US)

(73) Assignee: TekWear, LLC, Norcorss, GA (US)

( * ) Notice: Subject to any disclaimer, the term of this patent is extended or adjusted under 35 U.S.C. 154(b) by 0 days.

(21) Appl. No.: 16/317,752

(22) PCT Filed: Jul. 12, 2017

(86) PCT No.: PCT/US2017/041794
§ 371 (c)(1),
(2) Date: Jan. 14, 2019

(87) PCT Pub. No.: WO2018/022301
PCT Pub. Date: Feb. 1, 2018

(65) Prior Publication Data
US 2019/0250882 A1    Aug. 15, 2019

Related U.S. Application Data

(63) Continuation-in-part of application No. 14/676,534, filed on Apr. 1, 2015, now abandoned.
(Continued)

(51) Int. Cl.
*G06F 3/16* (2006.01)
*G06F 40/174* (2020.01)
(Continued)

(52) U.S. Cl.
CPC ............ *G06F 3/167* (2013.01); *G06F 3/0482* (2013.01); *G06F 9/542* (2013.01);
(Continued)

(58) Field of Classification Search
CPC .. G06Q 50/02; G06Q 30/0205; G06F 40/174; G06F 16/29; G06F 3/167
See application file for complete search history.

(56) References Cited

U.S. PATENT DOCUMENTS 6,327,569 B1    12/2001   Reep
8,433,617 B2     4/2013   Goad et al.
(Continued)

FOREIGN PATENT DOCUMENTS

WO    2013112411 A1    8/2013

OTHER PUBLICATIONS

International Search Report and Written Opinion mailed in International Application No. PCT/US2015/023905 filed Apr. 1, 2015.
(Continued)

*Primary Examiner* — Nhat Huy T Nguyen
(74) *Attorney, Agent, or Firm* — Husch Blackwell LLP

(57) ABSTRACT

A voice-interaction system enables mobile workers to capture measurements, observations and complete inspections using their voice as they move about, leaving one or both hands and eyes free to safely and effectively focus on work tasks. The system has the flexibility to recognize highly specialized vocabulary, prompting for and error-checking utterances that are unique to an industry, company, government agency, user or specific task. This data is saved and formatted to be viewed, listened to, or input into a structured data-base for further use.

32 Claims, 16 Drawing Sheets

Related U.S. Application Data

(60) Provisional application No. 62/361,311, filed on Jul. 12, 2016, provisional application No. 61/973,547, filed on Apr. 1, 2014.

(51) Int. Cl.

| | | |
|---|---|---|
| *G06Q 50/02* | (2012.01) | |
| *G06F 16/29* | (2019.01) | |
| *G06F 3/0482* | (2013.01) | |
| *G06F 9/54* | (2006.01) | |
| *G06F 16/2457* | (2019.01) | |
| *G06F 40/18* | (2020.01) | |
| *G06F 40/289* | (2020.01) | |

(52) U.S. Cl.
CPC ........ *G06F 16/24573* (2019.01); *G06F 16/29* (2019.01); *G06F 40/18* (2020.01); *G06F 40/289* (2020.01)

(56) References Cited

U.S. PATENT DOCUMENTS

| | | | |
|---|---|---|---|
| 8,489,127 B2 | 7/2013 | Huang et al. | |
| 8,615,521 B2 | 12/2013 | Jonas | |
| 2001/0029449 A1* | 10/2001 | Tsurufuji | G10L 15/20 |
| | | | 704/226 |
| 2006/0195318 A1 | 8/2006 | Stanglmayr | |
| 2007/0013967 A1 | 1/2007 | Ebaugh et al. | |
| 2007/0038449 A1 | 2/2007 | Coifman | |
| 2007/0225931 A1 | 9/2007 | Morse et al. | |
| 2009/0076804 A1 | 3/2009 | Bradford et al. | |
| 2010/0109946 A1* | 5/2010 | Pande | A01B 79/005 |
| | | | 707/759 |
| 2010/0241963 A1 | 9/2010 | Kulis et al. | |
| 2012/0072922 A1* | 3/2012 | O'Neil | G06Q 10/10 |
| | | | 719/313 |
| 2013/0013525 A1 | 1/2013 | Dlott et al. | |
| 2013/0318053 A1 | 11/2013 | Provenzano et al. | |
| 2013/0339030 A1* | 12/2013 | Ehsani | G10L 17/005 |
| | | | 704/275 |
| 2014/0005960 A1 | 1/2014 | Anderson et al. | |
| 2014/0229481 A1 | 8/2014 | Qureshi et al. | |
| 2014/0279573 A1* | 9/2014 | Coats | G06Q 30/0278 |
| | | | 705/306 |
| 2014/0365214 A1 | 12/2014 | Bayley | |
| 2015/0237470 A1 | 8/2015 | Mayor et al. | |
| 2016/0125883 A1* | 5/2016 | Koya | G10L 15/30 |
| | | | 704/232 |
| 2016/0140090 A1 | 5/2016 | Dale et al. | |

OTHER PUBLICATIONS

International Search Report and Written Opinion mailed in International Application No. PCT/US2017/041794 filed Jul. 12, 2017.

* cited by examiner

FIG. 1 EXEMPLARY SYSTEM OVERVIEW

EXEMPLARY SYSTEM ARCHITECTURE

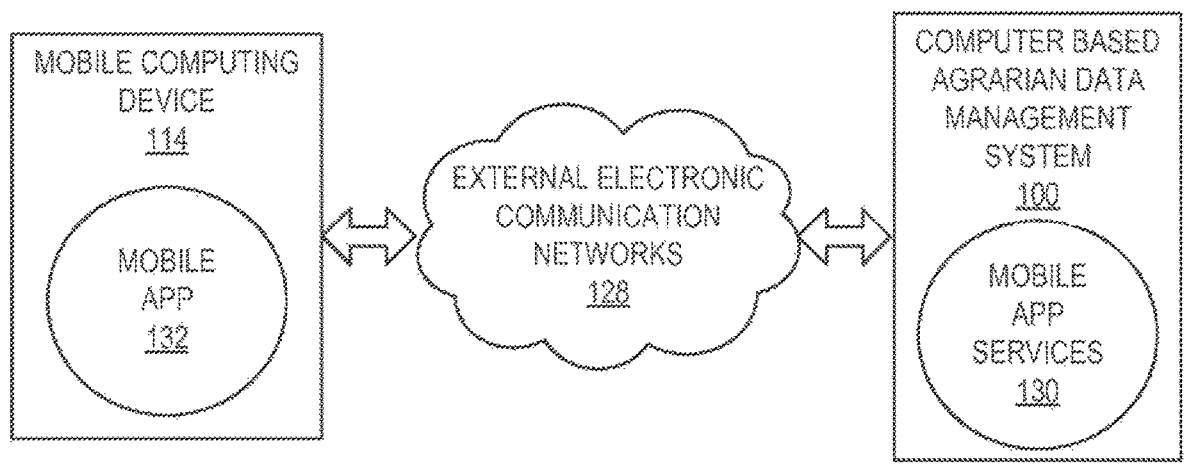
FIG. 3 EXEMPLARY SYSTEM ARCHITECTURE

INTEGRATED APP SUITE:

AGRARIAN DATA MANAGEMENT SYSTEM

- SMART GLASSES
- SMART WATCH
- SMART TEXTILES

CATEGORIES—
INFORMATION ABOUT:

- CROP SCOUTING "FIELD VIEW"
- MACHINERY & EQUIPMENT
- GRAIN MANAGEMENT
- ANIMAL HEALTH/SURVEILLANCE
- IRRIGATION SYSTEM
- PRECISION FARMING
- WIRELESS TECHNOLOGIES
- GPS/SATELLITES
- WEATHER & MARKET FORECASTING

APPS—
FOR CROPS:

| COTTON |
| CORN |
| SOY BEANS |
| RICE |
○
○
○
○

FIG. 4    EXEMPLARY USER INTERFACE

EXEMPLARY DEVICE ARCHITECTURE

EXEMPLARY DATA COLLECTION AND MANAGEMENT PROCESS

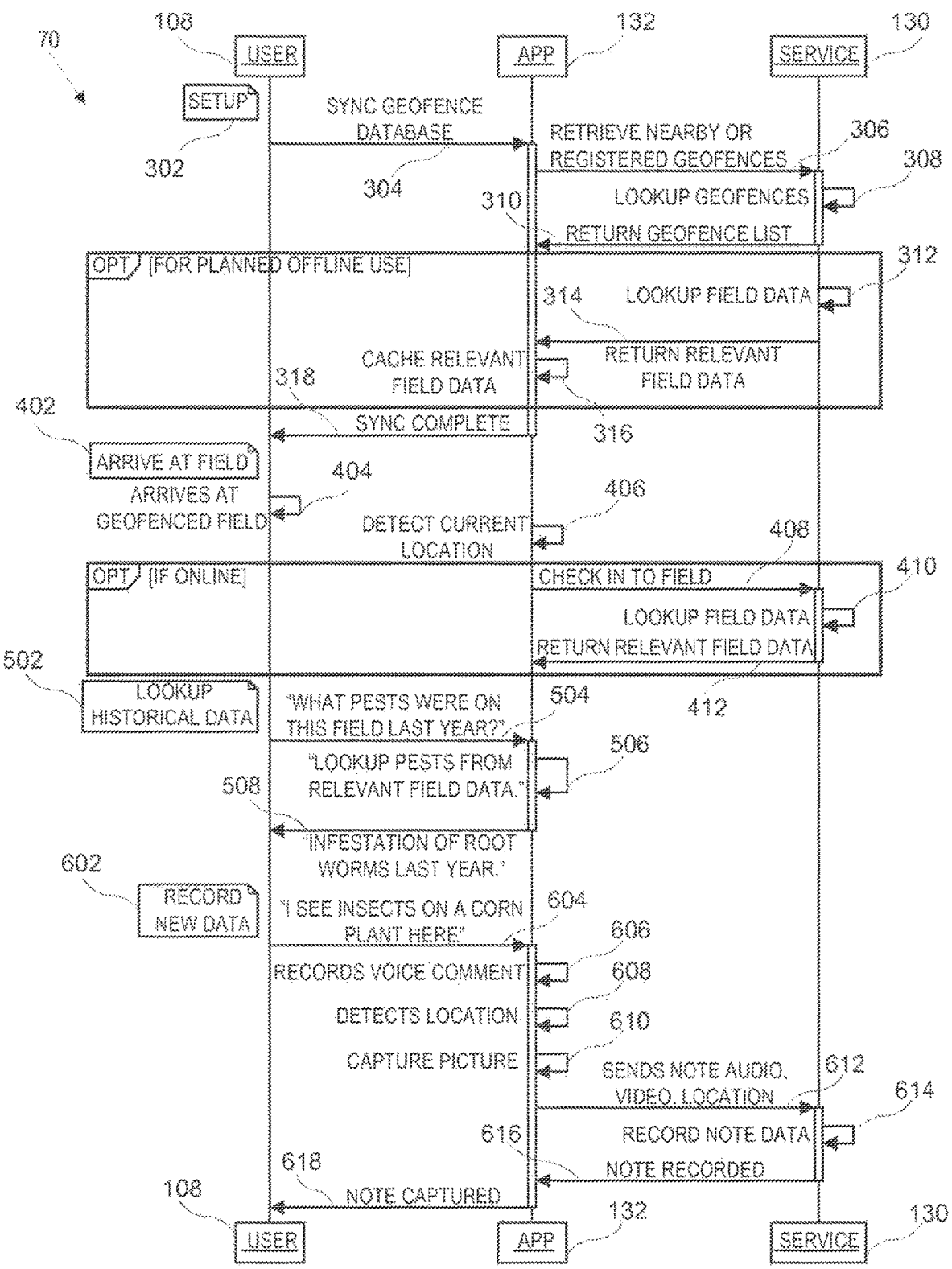
FIG. 7: EXEMPLARY GEOGRAPHIC LOCATION PROCESS

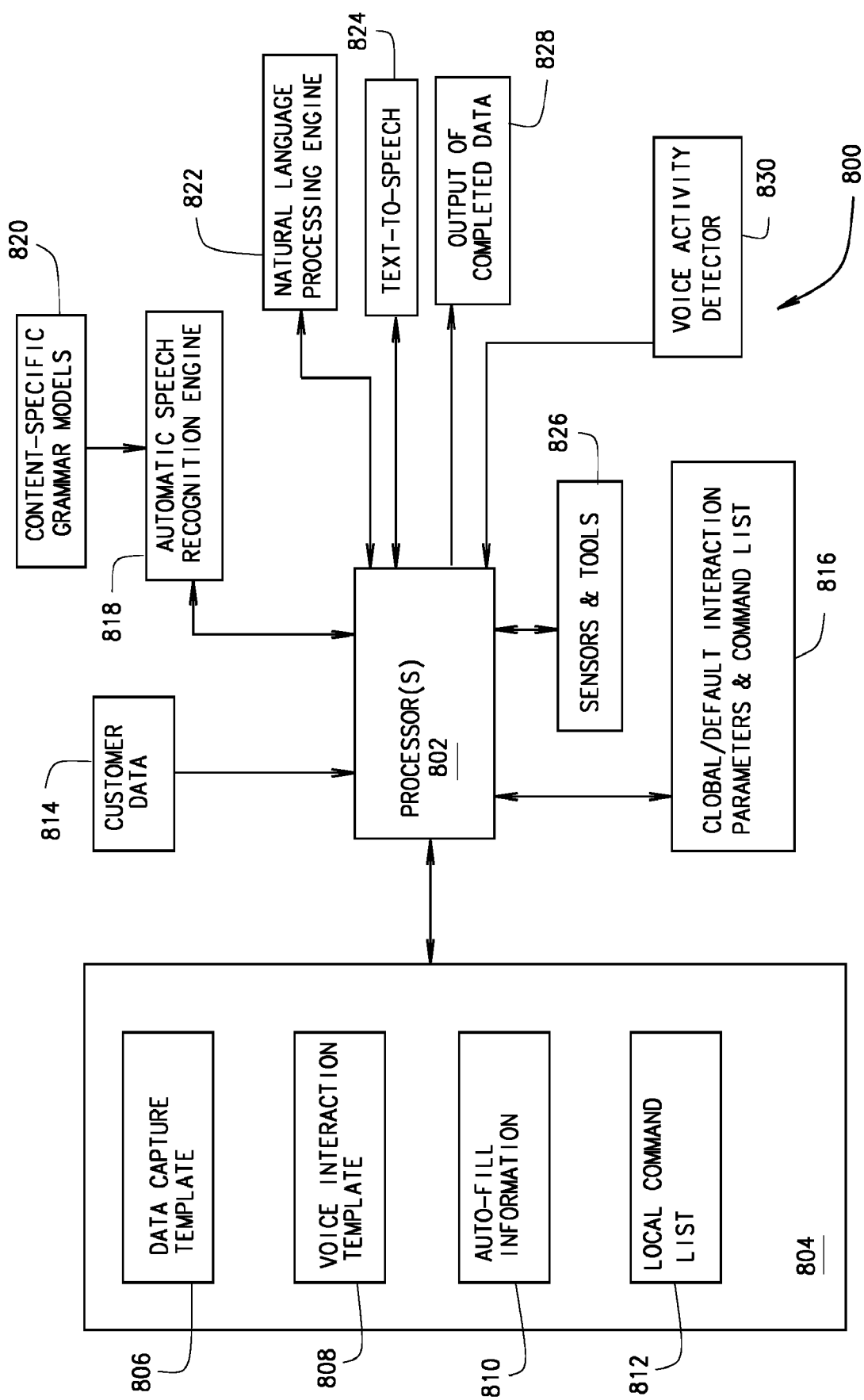

| CELL NAME | UNITS | WHICH RESTRICTED GRAMMAR RECOGNIZER? | RANGE OF ACCEPTABLE VALUES | SHORT PROMPT | LONG PROMPT | OUTLIER TRIGGER-LO | OUTLIER TRIGGER-HI | CEL SKIP-ABLE | BRANCH TRIGGER | PROMPT IF INCOMPLETE? |
|---|---|---|---|---|---|---|---|---|---|---|
| FRUIT SIZE | | INTEGERS | 0-9 | SIZE | FRUIT SIZE | | | NO | | YES |
| FRUIT SHAPE | | INTEGERS | 0-9 | SHAPE | FRUIT SHAPE | | | NO | | YES |
| FRUIT FIRMNESS | | INTEGERS | 0-9 | FIRMNESS | FRUIT FIRMNESS | | | NO | | YES |
| UNEVEN COLOR | | STRAW1 | YES OR NO | UNEVEN COLOR | UNEVEN COLOR | | | YES | | NO |
| CROP LOAD | | INTEGERS | 0-9 | LOAD | CROP LOAD | | | YES | | YES |
| FRUIT COLOR | | INTEGERS | 0-9 | COLOR | FRUIT COLOR | | | NO | | YES |
| RAIN DAMAGE | | INTEGERS | 0-9 | RAIN DAMAGE | ANY RAIN DAMAGE | | | YES | | NO |
| DISEASE RESISTANCE | | INTEGERS | 0-9 | DISEASE RESISTANCE | DISEASE RESISTANCE | | | YES | | NO |
| WHITE SHOULDERS | | STRAW1 | YES OR NO | WHITE SHOULDERS | WHITE SHOULDERS | | | YES | | NO |
| SEEDY TIPS | | STRAW1 | YES OR NO | SEEDY TIPS | SEEDY TIPS | | | YES | | NO |
| PLANT VIGOR | | INTEGERS | 0-9 | VIGOR | PLANT VIGOR | | | YES | | YES |
| SUNKEN SEEDS | | STRAW1 | YES OR NO | SUNKEN SEEDS | SUNKEN SEEDS | | | YES | | NO |
| COMMENTS | | STRAW2 | | COMMENTS? | ANY COMMENTS? | | | YES | | NO |

FIG. 9

| 1046 | SPEECH NOT RECOGNIZED AUDIO FILE | 1048 PRIMARY LANGUAGE | 1050 SECONDARY LANGUAGE | 1052 HEADER INFO SOURCE FILE | 1054 HEADER CEL NAMES, IN ORDER, PULLED FROM DATABASE |
|---|---|---|---|---|---|
| | | | | | PLANT ID, VARIETY, PLOT NUMBER, LOCATION, PLANTED DATE |
| | | | | C:FRUITCOS/PLOTDATA/STRAWBERRY/VENTURA/2017 | |
| | HONK.WAV | ENG | SPA | | |

FIG. 10B

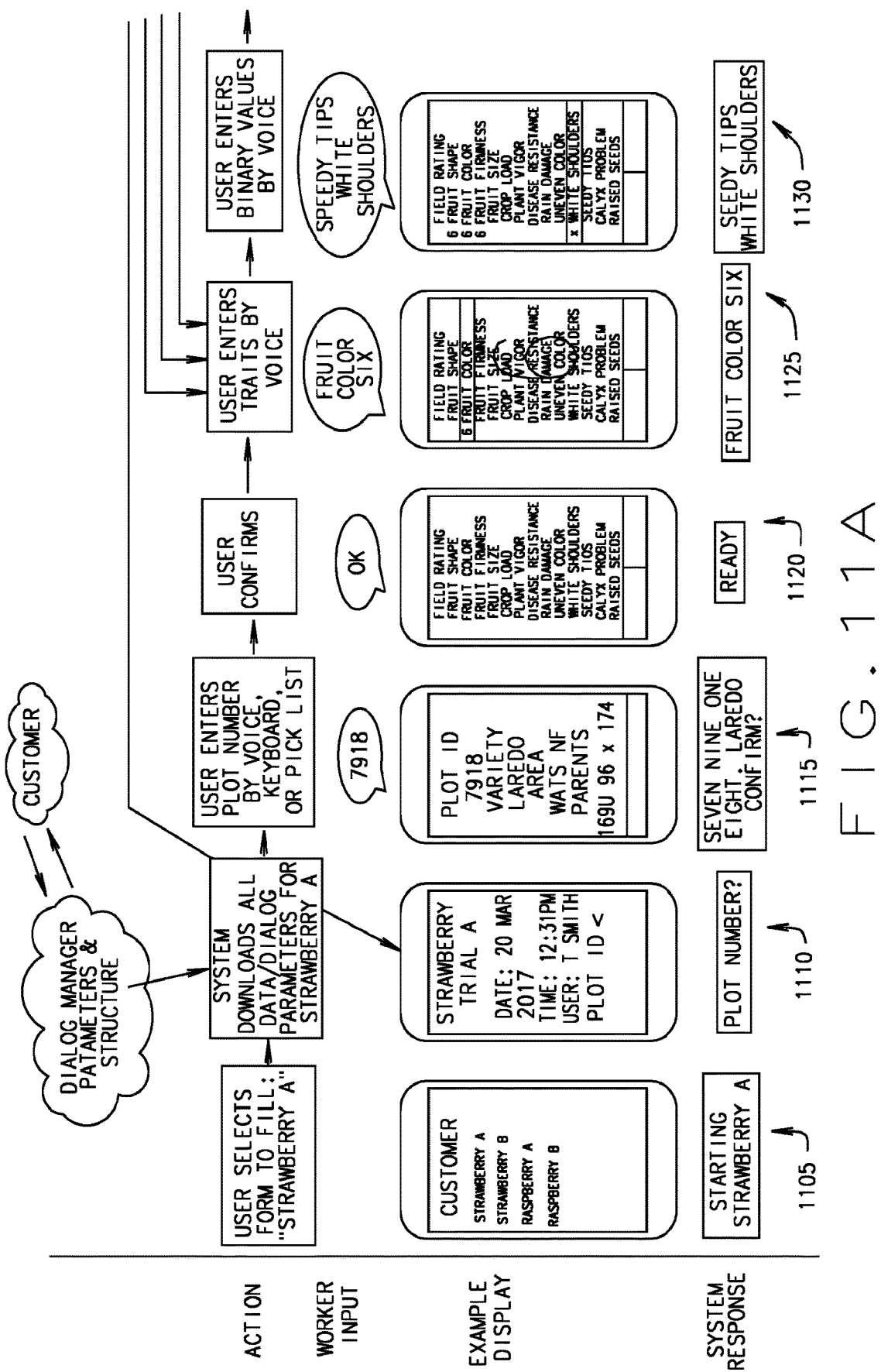

| PLOT ID | VARIETY | PLOT NUMBER | PLANTED DATE | INSPECTED BY | INSPECTION DATE | SIZE | SHAPE | COLOR | FIRMNESS | LOAD | VIGOR |
|---|---|---|---|---|---|---|---|---|---|---|---|
| 3457 | DIAMANTE | 1456X35-G37 | 4/15/2017 | DAVIS | 6/25/2017 | 6 | 5 | 4 | 5 | 4 | 4 |
| 3458 | B-55 | 1345BD-T76 | 4/15/2017 | DAVIS | 6/25/2017 | 5 | 4 | 5 | 6 | 4 | 7 |
| | | | | | | | | | | | |

| DAMAGE | RESISTANCE | WH SHLDRS | SEEDY TIPS | SUNKEN SEEDS | CREASED | UNEVEN COLOR | COMMENTS | LINK TO PHOTOS | LINK TO VOICE FILES |
|---|---|---|---|---|---|---|---|---|---|
| 1 | 0 | YES | YES | NO | NO | NO | BC-3, XF-2 | | |
| 0 | 2 | NO | NO | NO | YES | NO | SOME DEAD PLANTS | | |
| | | | | | | | | | |

FIG. 12

SYSTEMS, METHODS, AND APPARATUSES FOR AGRICULTURAL DATA COLLECTION, ANALYSIS, AND MANAGEMENT VIA A MOBILE DEVICE

CROSS REFERENCE TO RELATED APPLICATION

This application claims priority to U.S. Provisional Patent Application No. 62/361,311, filed Jul. 12, 2016, and is a continuation-in-part of U.S. patent application Ser. No. 14/676,534, filed Apr. 1, 2015, which itself claims priority to U.S. Provisional Patent Application No. 61/973,547, filed Apr. 1, 2014, all of which are hereby incorporated.

TECHNICAL FIELD

The present systems and methods relate generally to data collection, management, and use, and more particularly to data collection, geolocation, and scouting using hands-free voice recognition devices and software.

BACKGROUND

Many farming and other agricultural operations are very complex and require a number of team members to perform tasks in different agricultural interest zones. The collection and processing of data regarding these agricultural interest zones is an unwieldy and sometimes dangerous process.

In many industries even outside of agriculture, there is a need to measure, inspect or document observed conditions outside of a traditional office, often outdoors. Conventional data-gathering methods such as pen, paper and clipboard or electronic tablet are not ideal for documenting these observations accurately including precise location and date/time. Some work places present unique challenges due to temperature extremes, wind, dust and dirty, unsafe or unhygienic conditions.

There are several apps which may be used for crop scouting, and enable agriculture data to be collected in the field using text input on a smartphone screen. In other industries, such as construction, some system allow for recording voice notes and photos from a hand-held phone. Others use human transcription to produce PDF formatted daily reports for review and archiving. Voice-enabled warehousing data systems sometimes use a proprietary voice-interaction headset to connect warehouse workers to an enterprise logistics system. Other programs supply a range of voice-transcription services to the healthcare industry as well as a voice-input system for prescribing medications.

However, existing apps don't have a voice-optimized user experience. Instead, they require a graphical user interface that forces the user to look at and touch the screen. This is difficult in many user environments which may be dirty, dusty or wet, or in bright sunlight, all of which can result in limited legibility of on-screen interface elements. Such programs also are not optimal for workers who: are in motion, driving or operating equipment; need to use their hands to hold tools or touch animals, plants, or equipment, while capturing data where safety or hygiene may be a factor. In contrast, some other systems use proprietary audio-only hardware, and are focused on just one use case with limited range and scope. Some are single-mode, relying on voice only with no real-time backup

BRIEF SUMMARY OF THE DISCLOSURE

Briefly described, and according to one embodiment, aspects of the present disclosure generally relate to systems, methods, and apparatuses for data collection, management, and use, and more particularly to data collection, geolocation, and crop scouting using hands-free devices in agricultural interest zones.

The disclosed embodiments facilitate the gathering and accessing of a wide variety of agrarian, agricultural, and other farming data based on geolocation. Generally, the term "agricultural" in the present disclosure relates to farming, harvesting, crops, crop-scouting, animal husbandry, veterinary activities, agrarian practices, maintaining farm machinery, and all other related activities as will occur to one of ordinary skill in the art. The gathered data may include, but is not limited to, crop scouting, animal health/surveillance, farm machinery and equipment statuses, grain management, irrigation system statuses, weather and market forecasting, etc. To address these and other needs, the embodiments of the present disclosure relate to methods, devices, systems and computer program products that take advantage of both audiovisual and sensory capability of hands-free devices to push information to and from the agricultural interest zone seamlessly. In these embodiments, live photo, video and audio may be transmitted from the capture process, with transcription of the same by a human, an algorithm, or a combination of both. As a result, users may make sense of large amounts of information regarding their farms, may reduce the amount of paperwork, and may spend more time on high-value work activities in their agricultural interest zones with crops, machinery, and animals.

Generally, the disclosed embodiments accommodate novice users but are sophisticated enough to handle a broad range of necessary tasks. In one example embodiment, a program platform comprises a suite of application program software that is designed to allow users to utilize hands-free devices in a variety of farming operations. For example, the user may predefine criteria pertaining to a particular agricultural interest zone (e.g., data to be collected) and, once that user enters the agricultural interest zone, the hands-free device may manually or automatically collect data satisfying the predefined criteria.

In various embodiments, there are numerous benefits of using the disclosed system. The tools described herein may be more safely and more conveniently carried both in a particular agricultural interest zone and anywhere on a farm (e.g., field surveillance, animal surveillance, remote machinery monitoring, etc.). Also, the system may replace a number of items that previously needed to be carried into the field (such as large, bulky, physical and outdated identification guides). In various embodiments, the system also provides enhanced safety. For example, handling crops (e.g., cotton, corn, soybeans, or rice) sometimes requires two hands by one person to uproot, inspect, or hold a plant. Additionally, physical tools, such as a pocket knife and other agronomy-specific tools, are required to be used to perform a comprehensive assessment, write a prescription to remedy the issues, and improve the crop yield. With the hands-free devices, the user is able to safely use a pocket knife, or other physical tools.

According to one embodiment, the system includes an application that integrates with an existing, remote sensing online database. This database contains the outline of one or more agricultural interest zones in a particular geographic location and is further identified by the name of the owner of the agricultural interest zone (or some other identifier). Generally, in one embodiment, the agricultural interest zone may map to a common land unit (e.g., the smallest unit of land that has a permanent, contiguous boundary, a common land cover and land management, a common owner, and a common producer). A user may then walk into any agricultural interest zone and, once a "virtual fence" (e.g., geofence) is crossed, the hands-free device may greet the user in a personal way (e.g., announcing "Good morning, Mr. Fred Smith, welcome to Field #5, on the Smith Farm."). Generally, any work activities the user chooses to take within that agricultural interest zone may be digitally tracked, stored, recorded (and optionally) shared with other users or trusted service providers. In various embodiments, all record keeping may be 'passively' collected and analyzed to assess and optimize the future productivity, environmental responsibility, and potential profitability of the whole-farm operation.

According to various embodiments, the volume of information within the system may grow significantly in both quantity and variety. Users may have difficulty handling this quantity of information; thus, in one embodiment, a software program, with an algorithm as the engine, may be used to distill and reduce this glut of info into a distilled solution that both the user and his/her set of trusted partners (e.g., agronomist, crop specialist, seed, chemical, machinery specialist, etc.) may use in a practical, everyday way to take action and improve the crop yield in an agricultural interest zone.

In various embodiments, patterns of insect swarms and plant diseases over large geographic areas may be collected by the disclosed system. This information may be used to alert users at increased risk of infestation and ultimately save crops. For example, a crop alert hazard may be received by a user stating "corn rootworm reported 5.4 miles from your location."

Another embodiment is in the area of animal health/surveillance such as poultry production. A challenge to workers in this field is that they are in work environments (whether in a production building where chickens are raised or in a slaughtering facility) where they need to use one, or both, of their hands for worker safety. They are handling animals, yet still need to communicate or record the results of their observations. For example, a poultry inspector may need to touch both animals, as well as equipment in the facility/building, which would then be contaminated. The disclosed system enables a hands-free solution that allows the worker to capture and share, as well as receive, time-sensitive information that is required for them to perform their task efficiently.

In one embodiment, a method comprising the steps of: retrieving one or more predefined criteria corresponding to data management associated with a particular agricultural interest zone; transmitting the retrieved one or more predefined criteria for the particular agricultural interest zone to a particular hands-free device being operated by a user in the particular agricultural interest zone; receiving one or more data items from the particular hands-free device, wherein the one or more data items were automatically collected at the particular agricultural interest zone by the particular hands-free device; normalizing the one or more data items into a predetermined standardized format; comparing the normalized one or more data items to the retrieved one or more predefined criteria to ensure compliance with the retrieved one or more predefined criteria; and upon determination of compliance with the retrieved one or more predefined criteria, associating the normalized one or more data items with the particular agricultural interest zone and storing the normalized one or more data items in a database for subsequent processing.

In one embodiment, a method comprising the steps of receiving a location identifier, corresponding to a particular physical location, from a particular hands-free device; determining whether the particular physical location is within one or more predefined geofences, corresponding to one or more agricultural interest zones; and upon determination that the particular physical location is within one or more predefined geofences, retrieving one or more predefined criteria corresponding to data management associated with the one or more predefined geofences; and transmitting the retrieved one or more predefined criteria for the one or more predefined geofences to the particular hands-free device for subsequent data management purposes.

In one embodiment, a method comprising the steps of: determining a particular location identifier, corresponding to the particular physical location of a hands-free device; transmitting the particular location identifier to a server; receiving one or more predefined criteria, corresponding to data management associated with the particular location identifier, from the server; determining, from the received on or more predefined criteria, one or more data items to collect from the particular physical location and the manner of collection for each of the one or more data items; collecting the determined one or more data items from the particular physical location through the determined manner of collection; and transmitting the collected one or more data items to the server for subsequent processing.

According to one aspect of the present disclosure, the method, wherein normalizing the one or more data items into a predetermined standardized format further comprises the steps of: identifying a received format of a particular data item; retrieving the predetermined standardized format for a particular data item type corresponding to the particular data item from the retrieved one or more predefined criteria; and converting the particular data item from the received format to the predetermined standardized format. Moreover, the method, wherein comparing the normalized one or more data items to the retrieved one or more predefined criteria to ensure compliance with the retrieved one or more predefined criteria further comprises the steps of: identifying an expected range of a particular normalized data items from the retrieved one or more predefined criteria; and confirming that the particular normalized data item is within the expected range. Further, the method, wherein comparing the normalized one or more data items to the retrieved one or more predefined criteria to ensure compliance with the retrieved one or more predefined criteria further comprises the steps of: identifying an expected range of a particular normalized data items from the retrieved one or more predefined criteria; confirming that the particular normalized data item is within the expected range; and upon determination that the particular normalized data item is not within the expected range, transmitting a request for re-collection of the particular normalized data item to the particular hands-free device; receiving a recollected data item from the particular hands-free device; normalizing the recollected data item into the predetermined standardized format for the particular data item; and determining whether the normalized recollected data item is within the expected range.

According to one aspect of the present disclosure, the method, wherein the particular hands-free device is selected from the group comprising a mobile phone, a tablet, a head-mounted device, a sensor-enabled eyewear, a sensor-enabled hat, or a sensor-enabled piece of farm equipment. Additionally, the method, wherein the piece of farm equipment is selected from the group comprising a tractor, a planter, a combine, a chemical application sprayer, or a baler.

According to one aspect of the present disclosure, the method, wherein the predefined criteria includes a request to gather one or more atmospheric data items. Also, the method, wherein the one or more atmospheric data items is selected from the group comprising ambient temperature, barometric pressure, humidity, and light exposure. Furthermore, the method, wherein the predefined criteria includes a request to gather one or more geographic data items. Moreover, the method, wherein the predefined criteria includes a request to gather one or more temporal data items. Further, the method, wherein the predefined criteria includes a request to gather one or more data items regarding one or more crops within the particular agricultural interest zone. Additionally, the method, wherein the predefined criteria includes a request to gather one or more data items regarding the particular agricultural interest zone. Also, the method, wherein the hands-free device comprises a device that receives voice data from the user in a hands-free manner and is configured to convert the voice data to text data. Furthermore, the method, wherein the hands-free device comprises a device that receives voice data from the user in a hands-free manner and is configured to respond to voice commands.

According to one aspect of the present disclosure, the method further comprising the steps of: receiving one or more data items from the particular hands-free device, wherein the one or more data items were automatically collected at the particular physical location by the particular hands-free device; normalizing the one or more data items into a predetermined standardized format; comparing the normalized one or more data items to the retrieved one or more predefined criteria to ensure compliance with the retrieved one or more predefined criteria; and upon determination of compliance with the retrieved one or more predefined criteria, associating the normalized one or more data items with the one or more predefined geofences and storing the normalized one or more data items in a database for subsequent processing. Moreover, the method, wherein normalizing the one or more data items into a predetermined standardized format further comprises the steps of: identifying a received format of a particular data item; retrieving the predetermined standardized format for a particular data item type corresponding to the particular data item from the retrieved one or more predefined criteria; and converting the particular data item from the received format to the predetermined standardized format.

According to one aspect of the present disclosure, the method, wherein comparing the normalized one or more data items to the retrieved one or more predefined criteria to ensure compliance with the retrieved one or more predefined criteria further comprises the steps of: identifying an expected range of a particular normalized data items from the retrieved one or more predefined criteria; and confirming that the particular normalized data item is within the expected range. Further, the method, wherein comparing the normalized one or more data items to the retrieved one or more predefined criteria to ensure compliance with the retrieved one or more predefined criteria further comprises the steps of: identifying an expected range of a particular normalized data items from the retrieved one or more predefined criteria; confirming that the particular normalized data item is within the expected range; and upon determination that the particular normalized data items is not within the expected range, transmitting a request for re-collection of the particular normalized data item to the particular hands-free device; receiving a recollected data item from the particular hands-free device; normalizing the recollected data item into the predetermined standardized format for the particular data item; and determining whether the normalized recollected data item is within the expected range. Additionally, the method, wherein the stored data items are associated with at least a first geofence and the subsequent processing further comprises the step of comparing all of the stored data items for the first geofence with each other to determine any trends occurring within the first geofence. Also, the method, wherein the stored data items are further associated with at least a second geofence and the subsequent processing further comprises the step of comparing all of the stored data items for the first geofence with all of the stored data items for the second geofence to determine any trends occurring within the first or second geofences and/or any trends occurring across the first and second geofences.

In an example embodiment, a voice-interaction system is provided that enables mobile workers in any industry to capture measurements, observations and complete inspections using their voice as they move about, leaving one or both hands and eyes free to safely and effectively focus on work tasks. The system has the flexibility to recognize highly specialized vocabulary, prompting for and error-checking utterances that are unique to an industry, company, government agency, user or specific task. As used herein, the term user and worker may be used interchangeably, and these terms should also be interpreted to include (but not be limited to) a visitor, customer, applicant, or other person engaged in the capture of data while mobile. This data may be saved and formatted for further viewing, being played back, or otherwise input into a structured database for further use. The voice-optimized system enables users to record and document vital operational information safely and effectively while walking around, driving or riding in a vehicle. Data collected may include timestamps, location, images, workflow, observations, voice-files, measurements, sensor readings, and real-time user corrections. This data can be mined for trends, performance metrics and analyzed. The system may also improve in effectiveness over time via machine learning and facilitates customization to map to unique tasks in many industries. Metadata documenting the field capture process is captured.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

In an example embodiment, a method is provided for extracting data from voice-interactive inspections gathered by mobile workers to populate a pre-determined inspection template. The method includes creating a template of data fields for data to be collected, including control parameters controlling a voice interaction sequence with a worker, and including conformity and accuracy parameters for user notification and error checking. A processor of a mobile device executes a guided voice-interaction with the worker based on the template and parameters. A worker's utterances in response to or part of the guided voice-interaction are transcribed to an electronic text file via a speech recognition engine of a processor. The electronic text file is stored in an electronic database, and data values are extracted corresponding to the data fields in the template. Conformity and accuracy of the extracted data values are verified by comparing the data values to the conformity parameters and the accuracy parameters. The worker is prompted for confirmation when at least one of conformity and accuracy are below a threshold. A record is generated containing the values collected, combined with metadata about the location, time and user interaction.

An additional step of performing natural language processing on the electronic text file via a natural language processing engine of the processor may also occur. The speech recognition engine may be embodied in the processor of the mobile device, or in a connected server. A template may be selected automatically upon detection that the worker is within a pre-specified geofenced area or by the user. At least some data values may be input by a sensor in communication with the mobile device other than an audio sensor. The data values may include photographic or video files. The record may be encrypted. An additional step of creating a report using the metadata may also occur. The report may include at least one of: a number of words spoken by the worker, a number of corrected answers, a number of miles travelled by the worker per day, and an average minutes per plot inspected. A graphical report may be generated in a predetermined format. The predetermined format may be at least one of a PDF, jpeg, or .doc. An audio report may instead or also be generated.

Another step may be performed in which performance quality of the transcribing step is analyzed using the metadata by determining a number of user-corrected words and unknown words versus verified words. When a ratio of the user-correct words and unknown words versus verified words is above a threshold value, a reset of a local interaction parameter may be triggered. The resetting of local interaction parameters may include modifying the threshold at which workers are prompted to confirm, and/or at which a tone or voice notification alerts the user and/or at which the data value is read back.

A fully spoken word or phrase by a worker may be recorded as an abbreviation for the word or phrase based on a lookup table. The worker may select whether, upon read back, the word or phrase is read back, or the abbreviation is read back for user confirmation. A worker's utterance may include a command word or phrase, which upon confirmation of accuracy triggers an action. A notification may be generated when the system detects the occurrence of a pre-identified action based on additional data that may be detected via one or more sensors associated with the mobile device. The pre-identified action may include when the worker enters or leaves a geofenced area. The one or more sensors may include a location sensor, and location detection may be used to calculate a velocity at which the worker is moving. The one of more sensors may include a location sensor, and the worker may be guided via audio cues and simulated voice instructions to a predetermined point inside an agricultural interest zone.

The conformity parameters may include data regarding standard deviations of data collected. A determination of potential non-conformity may occur when a piece of collected data is outside a predetermined number of standard deviations from historical data.

The mobile device may include a continuously refreshing buffer of a predetermined number of seconds of audio. At least one of a voice activity detector and a voice-operated switch may be used as a filter on sound from a microphone of the mobile device. Upon detection of a voice by the voice activity detector or voice-operated switch, the audio in the buffer and subsequent real-time audio for a predetermined number of seconds after speech is no longer detected may be streamed to the speech recognition engine. The speech recognition engine may include multiple speech recognition sub-engines. Ambient sound may be sampled and compared to a pattern or threshold to create a predetermined threshold for a likelihood of good recognition. A low threshold for a likelihood of good recognition triggers a modification in a minimum confidence value for accepting a data value. Begin and endpoints of an audio file may be triggered by the worker on the mobile device.

Data received from the worker may include at least one trigger value that modifies a set of required data. Data received from the worker may include at least one trigger value that initiates a conditional path of the guided voice-interaction.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 3 illustrates an exemplary system architecture according to one embodiment of the present disclosure.

FIG. 4 illustrates an exemplary user interface of the agrarian data management system according to one embodiment of the present disclosure.

FIG. 7 illustrates a geographic location sequence diagram of the agrarian data management system according to one embodiment of the present disclosure.

FIG. 8 illustrates a block diagram of an example embodiment of a system for voice-activated data collection.

FIG. 9 illustrates an example data capture template according to an example embodiment.

FIGS. 10A and 10B illustrate an example voice interaction template according to an example embodiment.

FIGS. 11A-11C illustrates an example flow diagram of a process for voice-activated data collection according to an example embodiment.

FIG. 12 illustrates an example record of data according to an example embodiment.

DETAILED DESCRIPTION

Figure 1:
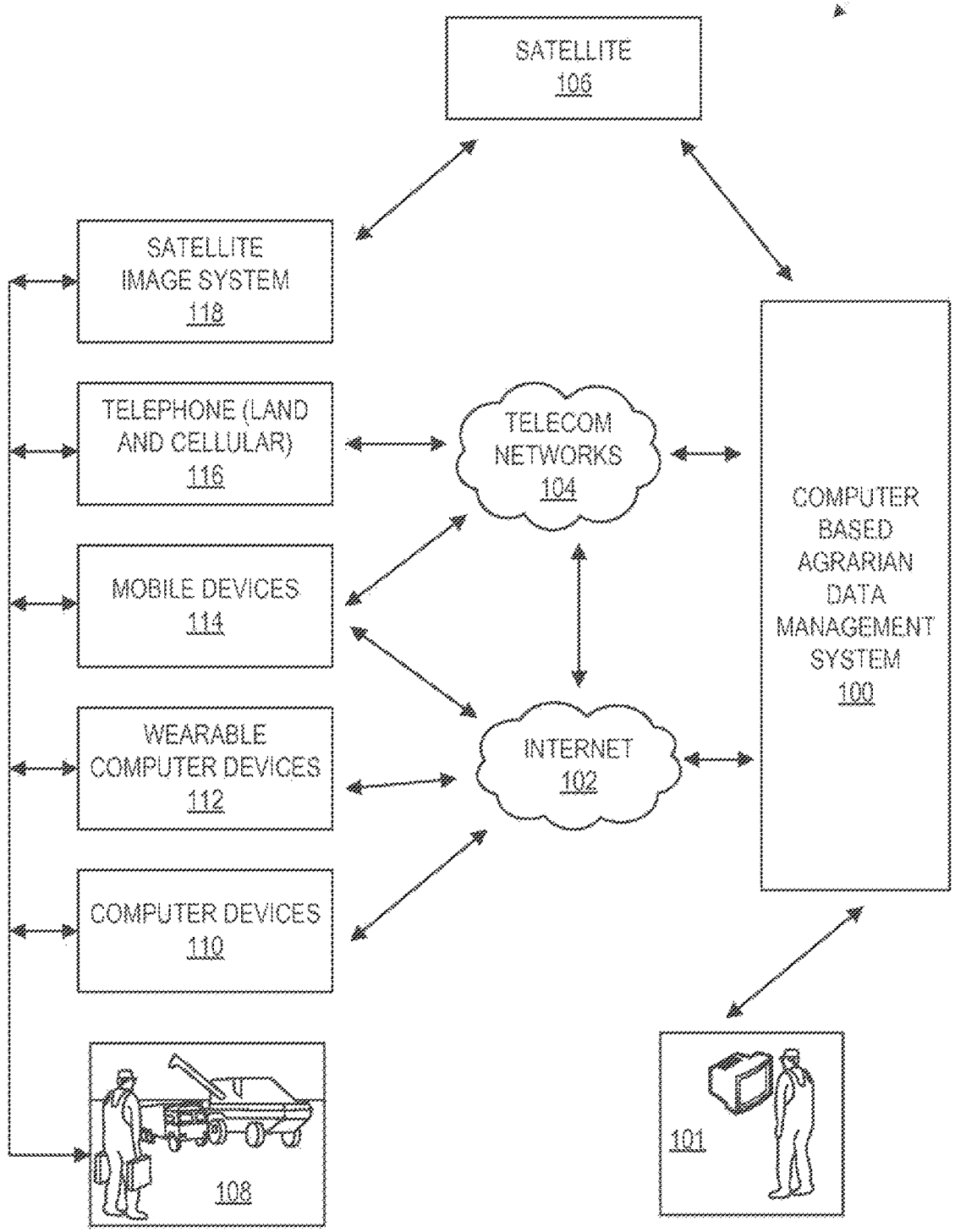
FIG. 1 illustrates an exemplary overview of a deployed computer based agrarian data management system according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems, methods, and apparatuses for data collection, management, and use, and more particularly to data collection, geolocation, and crop scouting using hands-free devices in agricultural interest zones.

The disclosed embodiments facilitate the gathering and accessing of a wide variety of agrarian, agricultural, and other farming data based on geolocation. Generally, the term "agricultural" in the present disclosure relates to farming, harvesting, crops, crop-scouting, animal husbandry, veterinary activities, agrarian practices, maintaining farm machinery, and all other related activities as will occur to one of ordinary skill in the art. The gathered data may include, but is not limited to, crop scouting, animal health/surveillance, farm machinery and equipment statuses, grain management, irrigation system statuses, weather and market forecasting, etc. To address these and other needs, the embodiments of the present disclosure relate to methods, devices, systems and computer program products that take advantage of both audiovisual and sensory capability of hands-free devices to push information to and from the agricultural interest zone seamlessly. In these embodiments, live video and audio may be transmitted from the capture process, with transcription of the same by a human, an algorithm, or a combination of both. As a result, users may make sense of large amounts of information regarding their farms, may reduce the amount of paperwork, and may spend more time on high-value work activities in their agricultural interest zones with crops, machinery, and animals.

Generally, the disclosed embodiments accommodate novice users but are sophisticated enough to handle a broad range of necessary tasks. In one example embodiment, a program platform comprises a suite of application program software that is designed to allow users to utilize hands-free devices in a variety of farming operations. For example, the user may predefine criteria pertaining to a particular agricultural interest zone (e.g., data to be collected) and, once that user enters the agricultural interest zone, the hands-free device may manually or automatically collect data satisfying the predefined criteria.

In various embodiments, there are numerous benefits of using the disclosed system. The tools described herein may be more safely and more conveniently carried both in a particular agricultural interest zone and anywhere on a farm (e.g., field surveillance, animal surveillance, remote machinery monitoring, etc.). Also, the system may replace a number of items that previously needed to be carried into the field (such as large, bulky, physical and outdated identification guides). In various embodiments, the system also provides enhanced safety. For example, handling crops (e.g., cotton, corn, soybeans, or rice) sometimes requires two hands by one person to uproot, inspect, or hold a plant. Additionally, physical tools, such as a pocket knife and other agronomy-specific tools, are required to be used to perform a comprehensive assessment, write a prescription to remedy the issues, and improve the crop yield. With the hands-free devices, the user is able to safely use a pocket knife, or other physical tools.

According to one embodiment, the system includes an application that integrates with an existing, remote sensing online database. This database contains the outline of one or more agricultural interest zones in a particular geographic location and is further identified by the name of the owner of the agricultural interest zone (or some other identifier). Generally, in one embodiment, the agricultural interest zone may map to a common land unit (e.g., the smallest unit of land that has a permanent, contiguous boundary, a common land cover and land management, a common owner, and a common producer). A user may then walk into any agricultural interest zone and, once a "virtual fence" (e.g., geofence) is crossed, the hands-free device may greet the user in a personal way (e.g., announcing "Good morning, Mr. Fred Smith, welcome to Field #5, on the Smith Farm."). Generally, any work activities the user chooses to take within that agricultural interest zone may be digitally tracked, stored, recorded (and optionally) shared with other users or trusted service providers. In various embodiments, all record keeping may be 'passively' collected and analyzed to assess and optimize the future productivity, environmental responsibility, and potential profitability of the whole-farm operation.

According to various embodiments, the volume of information within the system may grow significantly in both quantity and variety. Users may have difficulty handling this quantity of information; thus, in one embodiment, a software program, with an algorithm as the engine, may be used to distill and reduce this glut of info into a distilled solution that both the user and his/her set of trusted partners (e.g., agronomist, crop specialist, seed, chemical, machinery specialist, etc.) may use in a practical, everyday way to take action and improve the crop yield in an agricultural interest zone.

In various embodiments, patterns of insect swarms and plant diseases over large geographic areas may be collected by the disclosed system. This information may be used to alert users at increased risk of infestation and ultimately save crops. For example, a crop alert hazard may be received by a user stating "corn rootworm reported 5.4 miles from your location."

In one embodiment, aspects of the present disclosure relate to decision support systems to decrease environmental impact and improve profitability of the monitored agricultural interest zones.

Another embodiment is in the area of animal health/surveillance such as poultry production. A challenge to workers in this field is that they are in work environments (whether in a production building where chickens are raised or in a slaughtering facility) where they need to use one, or both, of their hands for worker safety. They are handling animals, yet still need to communicate or record the results of their observations. For example a poultry inspector may need to touch both animals, as well as equipment in the facility/building, which would then be contaminated. The disclosed system enables a hands-free solution that allows the worker to capture and share, as well as receive, time-sensitive information that is required for them to perform their task efficiently. To further understand the disclosed system a description of the figures may be useful.

Referring now to the figures, FIG. 1 illustrates an exemplary overview 10 of a deployed computer based agrarian data management system 100, according to one embodiment of the present disclosure. In one embodiment, the computer based agrarian data management system 100 (alternatively referred to herein as the "agrarian data management system" or "system") may be operatively connected to various hands-free devices via electronic communication interfaces. One skilled in the art will appreciate that the agrarian data management system 100 is not limited to the configuration in FIG. 1 but may include any combination of devices, networks, and/or other components necessary to carry out the functions of the agrarian data management system 100. According to one embodiment, a user 108 (e.g., a farmer, farmhand, etc.) may use one or more hands-free devices within an agricultural interest zone (e.g., a particular, bounded physical location, such as a particular field or area that contains a particular crop, collection of animals, farm equipment, etc.; a particular animal; a particular plant, tree, other crop, etc.; etc., that a user desires to monitor for any reason including, but not limited to, the collection and management of data, the tracking of performance over time, compliance reporting, etc. Generally, the term "agricultural yield zone" is used synonymously in this disclosure as "agricultural interest zone" or "AYZ" or "AIZ.")

In various embodiments, the agrarian data management system 100 includes servers, databases, software programs, other computing components, etc. to perform its disclosed functions. The agrarian data management system 100, in various embodiments, may be operatively connected to hands-free devices (also referred to herein as "mobile devices") via electronic communication interfaces, such as the internet 102, telecommunications networks 104 (e.g., land-based telephony systems, satellite, cellular telephony systems, etc.), satellite-based communication networks 106, etc. According to various embodiments, the hands-free devices may communicate with the agrarian data management system 100 through those same electronic communication interfaces. Generally, the agrarian data management system 100 and hands-free devices may communicate via any means that provide a reliable, real-time connection.

In various embodiments, hands-free devices include, but are not limited to, computer devices 110 (e.g., desktop and laptop computers), wearable computer devices 112 (e.g., head-mounted display devices, sensor-enabled hats, sensor-enabled eyewear Google Glass®, smart watches, smart textiles, etc.), mobile devices 114 (e.g., smart phones, tablets, etc.), telephones 116, satellite image devices 118, location-based devices (e.g., GPS, ground-based transmitters like an RTK system, etc.), and sensor-enabled farm equipment (e.g., tractors, balers, combines, planters, harvesters, chemical application sprayers, etc.). According to the specific aspects shown in FIG. 1, computer devices 110, wearable computer devices 112, mobile devices 114, and telephones 116 are all non-limiting examples of hands-free or mobile devices. Generally, a hands-free device may be any device that is capable of recording multi-modal data (e.g., sensor data, audio, visual, etc.) in an agricultural interest zone without the need to be physically held by a user 108. In one embodiment, a hands-free device may only receive one type of data (e.g., only sensor, only audio, only text, only speech, etc.). A person having ordinary skill in the art will recognize that, in some embodiments, the input received by hands-free devices may be tactile input (e.g., mobile devices 114 can receive voice commands but can also receive input from a user's 108 hands, fingers, etc.).

As will be appreciated by one having ordinary skill in the art, the hands-free devices provide a human interface for a user 108 to submit and receive information and to interface with the agrarian data management system 100. In various embodiments, the hands-free devices automatically record data regarding the agricultural interest zone, as will be further explained in connection with the description of FIG. 6. In one embodiment, the hands-free devices only record data when prompted by the user 108 (e.g., by pressing a button, saying a command, gesturing, etc.). In various embodiments, the hands-free devices may provide the user with information regarding the agricultural interest zone, as will be explained in connection with the description of FIG. 7.

Generally, in one embodiment, a user 108 is able to view all data collected via the hands free devices and agrarian data management system 100 in one central dashboard terminal 101. In various embodiments, the dashboard terminal 101 is any device capable of displaying the collected data (e.g., laptop and desktop computers, tablets, mobile phones, etc.). As will be appreciated by one having ordinary skill in the art, the dashboard terminal 101 allows a user 108 to monitor all data being recorded across agricultural interest zones, to share that data with other users, and to compare that data to historical records regarding those agricultural interest zones. In one embodiment, a user 108 may access the dashboard terminal 101 at a later date and/or different location than when and where the data was originally collected to view the collected data. To better understand the dashboard terminal 101 and the agrarian data management system 100, an explanation of the system architecture may be useful.

Figure 2:
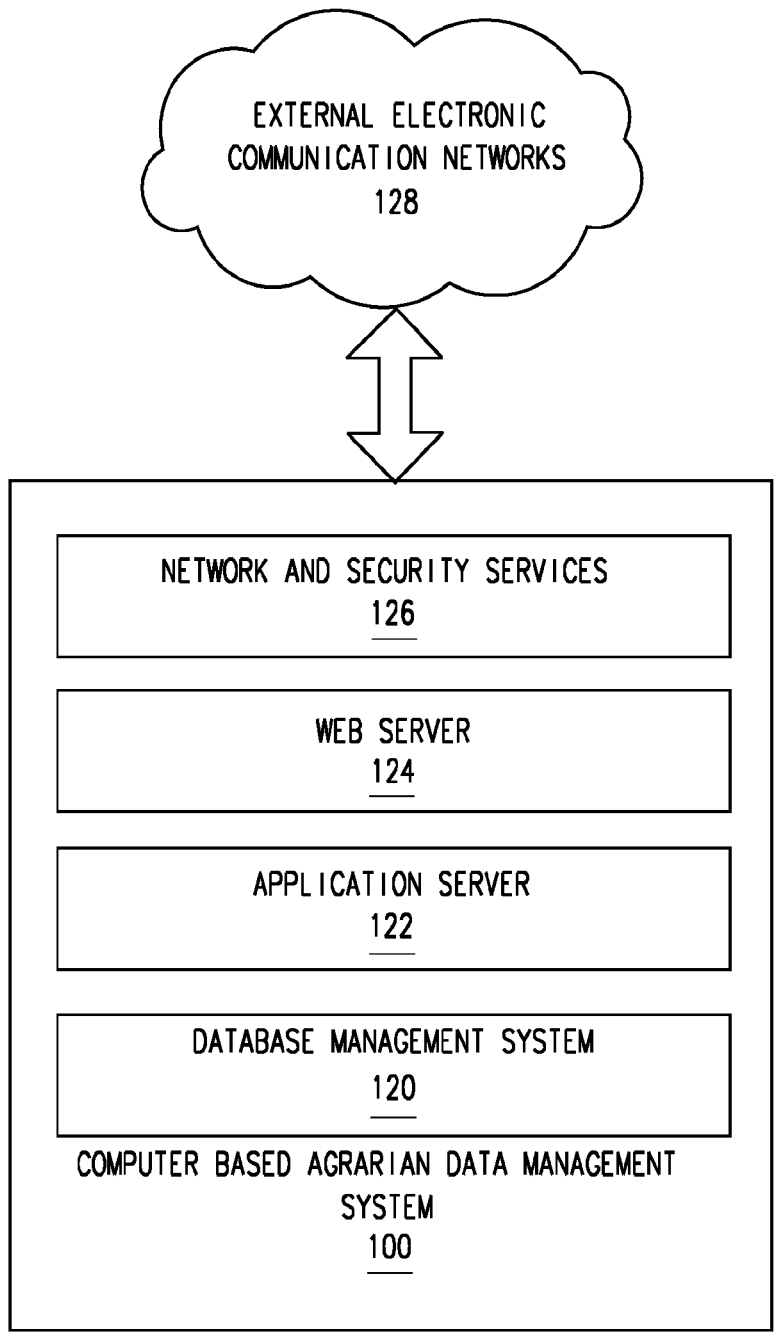
FIG. 2 illustrates an exemplary system architecture according to one embodiment of the present disclosure.

Now referring to FIG. 2, an exemplary agrarian data management system 100 architecture is shown according to one embodiment of the present disclosure. In various embodiments, the system 100 comprises a database management system 120, application server 122, web server 124, and network and security services 126.

According to one embodiment, the database management system 120 stores and associates data received from the hands-free devices and the user 108 regarding agricultural interest zones. As will be appreciated by one having ordinary skill in the art, the database management system 120 permits the user 108 to easily access information regarding a particular agricultural interest zone and to spot trends regarding specific crops, locations, pests, etc.

Still referring to FIG. 2, in one embodiment, the application server 122 may host unique computer-implemented services, such as data collection, data processing, data analysis, crop scouting, reporting, compliance, etc. For example, in various embodiments, the system 100 may communicate information to a user and also receive information from a user in a number of categories via services hosted on the application server 122. These categories may include, but are not limited to: crop scouting, machinery and equipment operational information, grain management, irrigation systems updates, precision farming, wireless technologies, GPS/Satellites, weather and market forecasting, etc. Each category may have multiple subcategories. For example, as will be further explained in connection with the description of FIG. 7, the crop scouting category may include various kinds of crops, such as cotton, wheat, soy beans, rice, etc.

In one embodiment, the web server 124 hosts web services which may include web page hosting and communicating with the application server 122 and/or the database management system 120. Generally, the system 100 may implement network and security services 126 to provide communication interface services with hands-free devices via the external communication networks 128 (e.g., internet 102, telecommunications networks 104, or satellite-based communication networks 106 from FIG. 1). To further understand the communication between the system 100 and the hands-free devices, an explanation of the hands-free device's architecture may be useful.

FIG. 3 illustrates the system architecture of an exemplary deployed agrarian data management system 100, according to one embodiment of the present disclosure. Generally, a mobile computing device 114 (e.g., hands-free device) runs one or more mobile applications 132 (e.g., for crop scouting, machinery and equipment operational information, grain management, irrigation systems updates, precision farming, wireless technologies, GPS/Satellites, weather and market forecasting, etc.). The functionality of the mobile applications 132 will be further explained in connection with the description of FIG. 7. In various embodiments, the mobile computing device 114 is operatively connected to the computer based agrarian data management system 100 via external communication networks 128. In one embodiment, the mobile application 132 provides computer-implemented methods for the users 108 to interact with the system 100.

In one embodiment, the system 100 hosts a mobile application service 130 on the application server 122. According to various embodiments, the mobile application service 130 communicates over an electronic communications network 128 with mobile applications 132 hosted on mobile computing devices 114 (e.g., hands-free devices). The functionality of the mobile application service 130 will be further explained in connection with the description of FIG. 7. According to one embodiment, services and devices integrated into existing hands-free devices (e.g., smart phones) enable electronic signature parameters such as latitude and longitude via built in GPS and/or built in location lookup capability, network derived time stamps, phone number, cellular tower metadata, cellular handset identifiers, network MAC address, network IP address, and built in biometric signatures to be delivered with an information report. To better understand how hands-free devices function within the system 100, a description of the system user interface may be useful.

Referring now to FIG. 4, an exemplary user interface 134 of the agrarian data management system 100 according to one embodiment of the present disclosure is shown. Generally, the exemplary user interface 134 may be viewed on any hands-free device or the dashboard terminal 101 from FIG. 1. In various embodiments, the user interface 134 provides access to a suite of mobile applications, such as mobile application 132 shown in FIG. 3, for various tasks. According to one embodiment, these applications may synchronize and provide information to a user 108 in real-time through the day, as requested or configured by the user 108. In a particular embodiment, the information may be supplied via application programming interfaces (e.g., "APIs") from multiple vendors, which may include, but are not limited to, machinery, seed, fertilizer, grain storage, chemical, and irrigation vendors. Generally, the ability to have a diversity of data inputs means that the system may be vendor agnostic, which is advantageous to users because the user does not have to be locked-in to the products and services of a single vendor. In a particular embodiment, the information may be user generated via hands-free devices or other inputs.

In various embodiments, the user interface 134 offers a unified experience for use of the system 100 and may be simple and practical to use. In one embodiment, the user interface 134 combines at least five elements: mobile, social media, data, sensors, and location-based services. Generally, these elements may work together in a synergistic fashion to deliver the highest, most relevant information to the task at hand in the agricultural interest zone. The integration of hands-free devices means, in various embodiments, that the user 108 has the freedom to work with both hands and simultaneously have hands-free communication. According to various embodiments, the system 100 enables real-time transfer of information to and from a field of crops (as will be further explained in the descriptions of FIGS. 6 and 7). In one embodiment, the system 100 provides remote expertise for unskilled labor so that they may conduct complicated tasks with little to no training. In a particular embodiment, the system 100 provides contextual computing, and a GPS chip in the wearable devices means that the user may be informed of their exact location and dynamic navigation maps may be delivered.

As will be appreciated by one having ordinary skill in the art, the user interface of the system 100 may not have any visual component but may instead rely on audio descriptions and inputs, tactile buttons and inputs, gestures, etc. Generally, the system 100 may have the same functionality regardless of the user interface, and the user interface may be adapted for the task that it enables for the hands-free device on which it operates.

Figure 5:
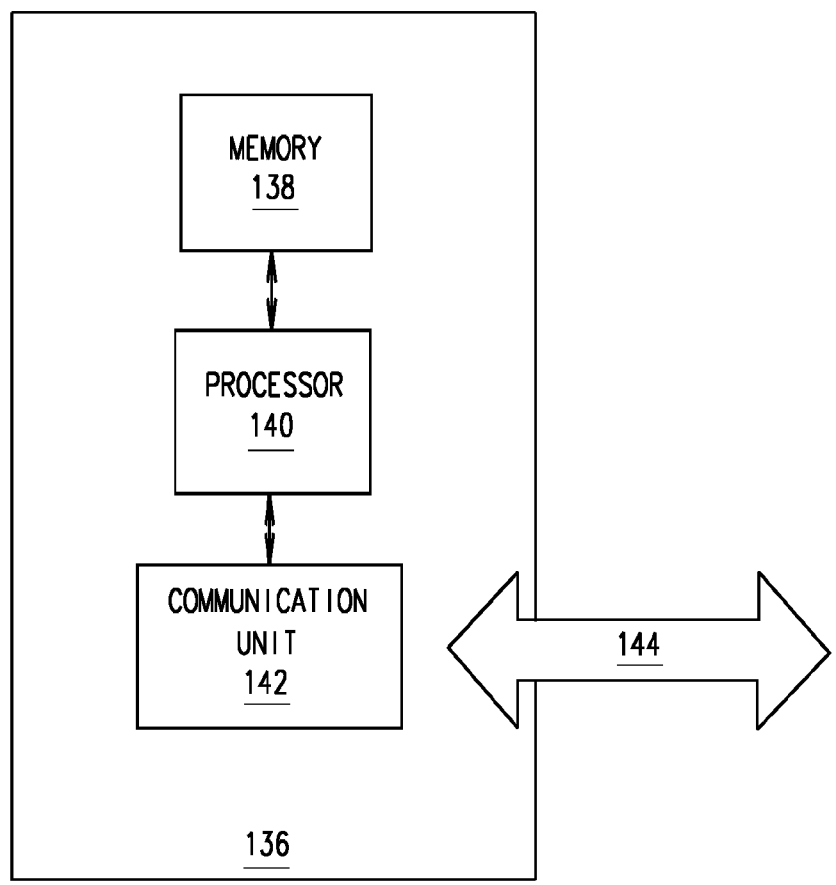
FIG. 5 illustrates the architecture of an exemplary device according to one embodiment of the present disclosure.

An understanding of the devices that run the system 100 may be useful to further explain the user interface 134. Generally, the functions accessed through the user interface 134 may be implemented using the system 100 described in FIGS. 1-7. In various embodiments, a device 136 as shown in FIG. 5 may be employed to implement these functions. According to one embodiment, the device 136, which is part of the agrarian data management system 100, comprises a memory unit 138, a processor 140, a communication unit 142 and a communication link 144. According to another embodiment, device 136 (e.g., hands-free device), comprises a memory unit 138, a processor 140, a communication unit 142 and a communication link 144. Generally, the device 136 runs data collection processes and geolocation processes of which further explanation may be useful.

Figure 6:
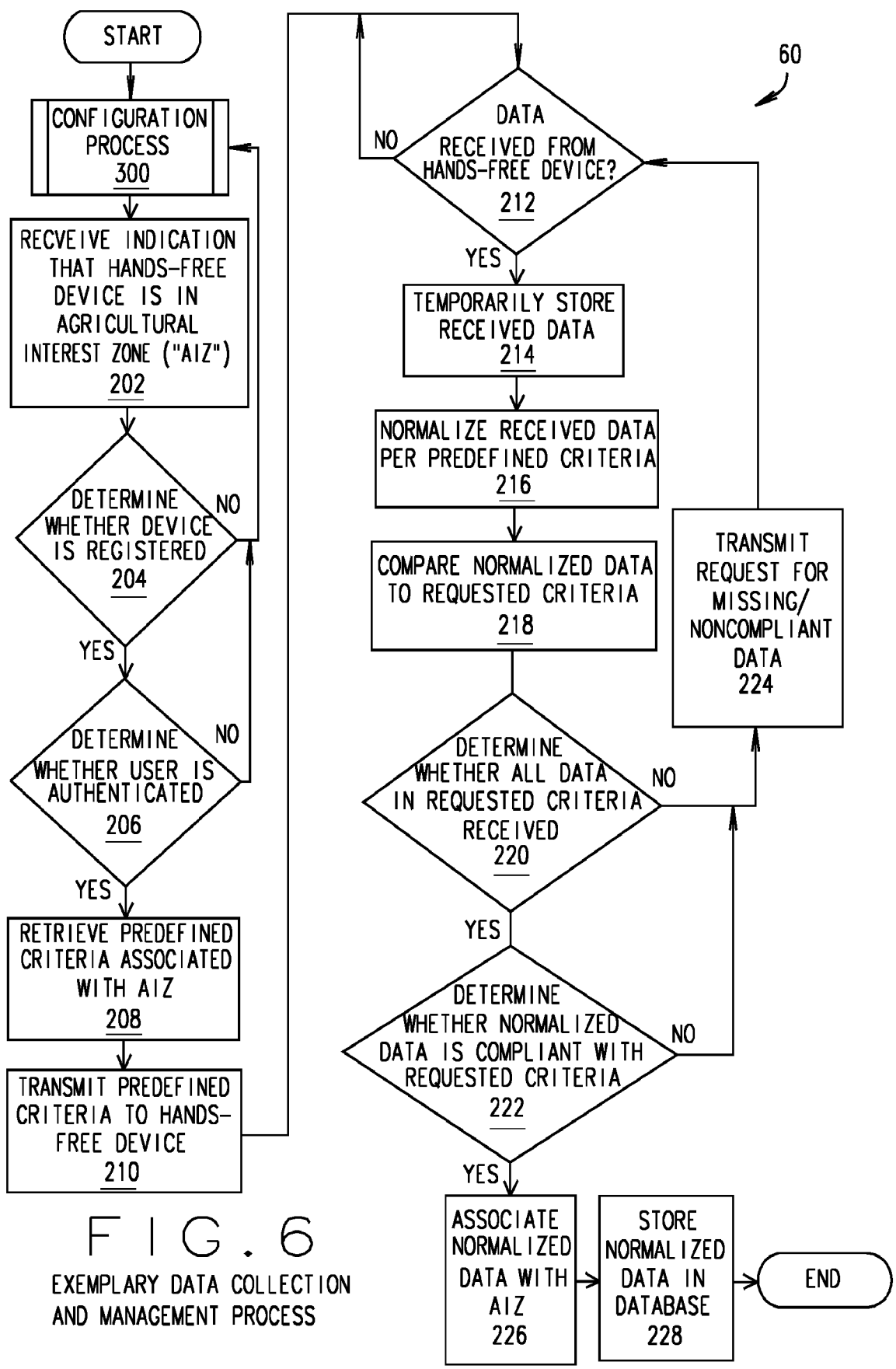
FIG. 6 illustrates an exemplary data collection and management process of the agrarian data management system according to one embodiment of the present disclosure.

Now referring to FIG. 6, an exemplary data collection and management process 60 of the agrarian data management system 100, according to one embodiment of the present disclosure, is shown. In various embodiments, some of the processes may run on the agrarian data management system 100 while others run on a hands-free device. In some embodiments, all of the processes may run on a hands-free device. As will be understood by one having ordinary skill in the art, the steps and processes shown in FIG. 6 (and those of all other flowcharts and sequence diagrams shown and described herein) may operate concurrently and continuously, are generally asynchronous and independent, and are not necessarily performed in the order shown.

In particular embodiments, the data collection process begins with the configuration process 300. Generally, the configuration process 300 comprises receiving designations of criteria (e.g., predefined criteria) that will dictate various rules relating to data capture preferences, reporting requirements, data templates, user information, agricultural interest zone information, etc. In one embodiment, a user 108, during the configuration process 300, may define agricultural interest zones and their corresponding geographical locations (e.g., geofencing as will be explained in connection with the description of FIG. 7), planted crops, past histories (e.g., prior pest infestations, plantings, pesticide/herbicide/fertilizer applications, etc.), etc. With this information, according to one embodiment, the configuration process 300 may determine the criteria and data to be gathered in an agricultural interest zone. In a particular embodiment, the user 108 may define the criteria and data to be gathered and used in an agricultural interest zone. According to various embodiments, the user 108 may designate the particular users and hands-free devices that may collect and access data within an agricultural interest zone.

Referring still to FIG. 6, at step 202, in a particular embodiment, the agrarian data management system 100 receives an indication (via interact 102, telecommunications networks 104, satellite-based communication networks 106, etc.) that a hands-free device is physically present in an agricultural interest zone. Generally, the methods of determining whether a device is in a particular agricultural interest zone will be better understood in connection with the description of FIG. 7. Continuing at step 204, in one embodiment, the system determines whether the hands-free device is registered for data collection within that particular agricultural interest zone. If the hands-free device is not registered for data collection within that particular agricultural interest zone, then, in one embodiment, the system returns to the configuration process 300. If the hands-free device is registered for data collection within that particular agricultural interest zone, then, according to one embodiment, the system determines, at step 206, whether the user 108 is authenticated to use that hands-free device and to collect data within that particular agricultural interest zone. If the user is not authenticated, in one embodiment, then the system returns to the configuration process 300.

If the user is authenticated, in a particular embodiment, then the system retrieves the predefined criteria associated with the agricultural interest zone at step 208. In one embodiment, the predefined criteria may be from the configuration process 300. The predefined criteria, generally, are rules and/or settings that define whether and which data to collect in a particular agricultural interest zone, which users and/or hands-free devices may collect that data, etc. In step 210, according to one embodiment, the system transmits the predefined criteria to the hands-free device. In one embodiment, the hands-free device may use the predefined criteria to determine whether and which data to collect in the agricultural interest zone. For example, the predefined criteria may indicate a list of several data items that may be collected from an agricultural interest zone (e.g., temperature, light exposure, etc.). In various embodiments, the system may automatically collect the data defined in the predefined criteria via the hands-free device. According to various embodiments, the system may prompt the user to manually collect the data defined in the predefined criteria via the hands-free device. In particular embodiments, the hands-free device transmits collected data to the system for processing and storage.

According to various embodiments, the system determines whether data has been received from the hands-free device at step 212. Generally, steps 212-228 may occur at a central server, backend server, device, etc. within the system. If the system has not yet received data from the hands-free device, then the system waits until the data has been received. Once the system determines that data has been received, then, in one embodiment, the system temporarily stores the data at step 214. As will be appreciated by one having ordinary skill in the art, the system may temporarily store the data in any suitable storage medium and format. According to various embodiments, at step 216, the system normalizes the data received from the hands-free device in accordance with the predefined criteria. For example, the system converts measurements into the proper units, processes videos and/or images to determine their content, converts audio files to text, etc. At step 218, in one embodiment, the system compares the normalized data to the criteria that was requested in the predefined criteria. As will be appreciated by one having ordinary skill in the art, normalizing the data and steps 220 and 222, may help the system ensure the accuracy of the data collection process.

Still referring, to FIG. 6, at step 220, the system determines whether all of the criteria requested in the predefined criteria were received from the hands-free device. If some of the requested criteria are missing, then, in one embodiment, the system transmits a request for the missing data at step 224. If all of the requested criteria are present, then, in one embodiment, the system determines, at step 222, whether all of the normalized data is compliant with the requested criteria from the predefined criteria (e.g., all of the temperature data was within the expected ranges, etc.). If some of the data is not compliant with the requested criteria, then the system transmits a request for the noncompliant data at step 224. After transmitting the request for noncompliant and/or missing data at step 224, the system determines, in one embodiment, whether the requested data has been received at step 212.

If all of the data is compliant with the requested data, then, in one embodiment, the system associates the normalized data with the agricultural interest zone from which it was gathered at step 226. As will be appreciated by one having ordinary skill in the art, associating the normalized data with the agricultural interest zone permits the user 108 to access data for specific locations, compare historic information, etc. At step 228, in one embodiment, the system stores the normalized data in a database, and the data collection process ends thereafter. In one embodiment, step 228 may include transmitting the data to a central or backend server within the system 100. To further understand the data collection process, a description of the geographic location process may be useful.

Referring now to FIG. 7, a geographic location sequence diagram 70 of the agrarian data management system 100 is shown according to one embodiment of the present disclosure. Generally, the geographic location sequence diagram 70 depicts the geographic location setup process 302, geographic location determination process 402 (alternatively referred to herein as the "geolocation process"), and exemplary use cases 502 and 602, according to particular embodiments of the present disclosure. In various embodiments, the processes shown in FIG. 7 permit the system 100 to determine which agricultural interest zones a particular hands-free device is within and to collect and manage data associated with those agricultural interest zones.

In various embodiments, the geographic location setup process 302 begins when the user 108, at step 304, syncs a geofence database to a particular mobile application 132 on a hands-free device. In one embodiment, the geofence database contains the information for the geofences (e.g., virtual barriers that define the boundaries of a particular agricultural interest zone latitude/longitude coordinates or other location methodology) known by the agrarian data management system 100 that pertain to particular agricultural interest zones monitored by the agrarian data management system 100. Generally, the geofences may or may not relate to a specific agricultural interest zone and may be more discrete in size than a field (e.g., a specific animal, flock, herd, piece of equipment, particular pinpoint location either within or relating to an agricultural interest zone, etc.). At step 306, in various embodiments, the application 132 requests, from the application service 130, a list of the geofences that are proximate to the user's location or registered in the system 100. The application service 130, in one embodiment, at step 308, retrieves the list of geofences and transmits that list to the application 132 at step 310. At step 312, according to one embodiment, the application service 130 may retrieve data pertaining to a particular agricultural interest zone and transmit that data to the application 132, at step 314. According to one embodiment, if the application anticipates operating in an offline mode (e.g., not connected to the application service 130 via a communications network 128), then at step 316, the application 132 may cache the data received at step 314. At step 318, once syncing the geofence database to the particular application 132 is complete, the setup process 302 ends. After setup, the user 108 is now ready to begin the geographic location determination process 402.

The geographic location determination process 402, in various embodiments, begins when the user enters a geofenced agricultural interest zone at step 404. At step 406, in one embodiment, the application 132 determines the current location of the user 108 (e.g., via GPS, RTK, etc.). According to one embodiment, at step 408, the application 132 transmits to the application service 130 that it has arrived within the agricultural interest zone. At step 410, in a particular embodiment, the application service 410 retrieves the data relevant to the agricultural interest zone (e.g., the predefined criteria from FIG. 6) and transmits the data, at step 412, to the application 132. In various embodiments, the geographic location determination process 402 ends thereafter. As will be appreciated by one having ordinary skill in the art, in various embodiments, the geographic location determination process 402 may occur before, during, or after the geographic location setup process 302.

Still referring to FIG. 7, once the user 108 is within a particular agricultural interest zone, in various embodiments, the user 108 may take various actions regarding the agricultural interest zone (e.g., retrieve data regarding the agricultural interest zone via the lookup process 502, record new data regarding the agricultural interest zone via the recording process 602, etc.). As will be appreciated by one having ordinary skill in the art, the lookup process 502 and recording process 602 may be repeated as many times as desired by the user 108 within a particular agricultural interest zone. Further, the particular steps in FIG. 7 for the lookup process 502 and recording process 602 are not required parts of the sequence but are instead exemplary steps of the processes, according to one embodiment.

In one embodiment, the lookup process 502 permits the user 108 to query 504 the application 132 to determine information regarding the agricultural interest zone (e.g., "what pests where in the agricultural interest zone last year?") Generally, the user 108 may query 504 the application 132 for any information relevant to the agricultural interest zone (e.g., standing in an orchard next to a tree, a user 108 may query 504 the variety of tree, moisture received by the tree over the current growing season, chemicals the tree has been treated with in the last decade, etc.; standing in a corn field, the user 108 may query 504 the variety of corn in a particular row, etc.; standing on or near a piece of equipment, the user 108 may query 504 the maintenance history of the equipment, the next scheduled maintenance, etc.; etc.). At step 506, in one embodiment, the application retrieves the requested information and transmits it, at step 508, to the user 108. In various embodiments, the application 132 may provide, at step 508, an audible response to the query 504 or a textual response. After providing the response, the lookup process 502 ends thereafter.

In a particular embodiment, the recording process 602, which may be complimentary to the data collection process as explained in connection with the description of FIG. 6, permits the user 108 to record information regarding the particular agricultural interest zone. According to a particular embodiment, the user 108 makes a note regarding the agricultural interest zone at step 604 (e.g., the presence of pests on the crops in the agricultural interest zone). In various embodiments, the application 132 may receive, at step 604, audio, visual, or textual data. At step 606, the application 132, in one embodiment, records the data regarding the agricultural interest zone. In one embodiment, the application 132, at step 608, associates the data with the location in which the data was generated. According to a particular embodiment, at step 610, the application may record additional data to bolster the data received from the user at step 604 (e.g., taking an additional sensor reading, a photo, etc.). At step 612, in one embodiment, the application 132 transmits the data from steps 604, 608, and 610 to the application server 130. In one embodiment, at step 614, the application server 130 stores the data from step 612. At step 616, in one embodiment, the application server 130 transmits confirmation of storage of the data to the application 132; at step 618, the application 132 transmits confirmation of the storage of the data to the user 108 and the recording process 602 ends thereafter.

In various embodiments, a user 108 may initiate and perform the recording process 602 on a hands-free device to collect multiple different data items in several ways. For example, in one embodiment, a user 108 may use Google Glass® to record video of the crops within a particular agricultural interest zone. In another embodiment, a user 108 may use a smartphone to record the ambient temperature of a particular agricultural interest zone. In a particular embodiment, a user 108 may use a sensor-enabled hat to record the wind speed in a particular agricultural interest zone. In yet another embodiment, a user 108 may use a tablet to record audio or typed notes regarding a particular agricultural interest zone. In a further embodiment, a user 108 may use a head-mounted device to record speech to be converted/translated to text data.

According to another particular embodiment, the recording process 602 may be used to scout crops within an agricultural interest zone. In various embodiments, crop scouting (e.g., "crop doctor procedures") comprises uprooting plants, inspecting them for diseases, insects, and other anomalies, and recording the findings. Hands-free devices and the recording process 602, according to one embodiment, are used by the user 108 to record and share results of croup scouting. For example, in one embodiment, by using the integrated video and hands free interface of sensor-enabled eyewear, the user 108 is able to use two hands to handle crops while recording information regarding the condition of crops. Continuing with this example, the user 108 may use voice commands to perform all necessary functions such as taking photographs, requesting instructions, etc. In one embodiment, the voice commands initiates a protocol within the application 132 that triggers the hands-free device to perform a particular function (e.g., take photographs, record audio/video, record sensor data, record audio for subsequent speech to text translation, etc.) Further, in this example, data may also be broken down into specific metrics determined by crop type and results may be recorded.

Still referring to FIG. 7, additional uses of the recording process 602 for crop scouting will now be described. During the initial phase of the crop scouting, in one embodiment, a front end application (e.g., application 132) may tag each inspection with a GPS location and date, which may be received from a smart phone or other hands-free device. In one embodiment, a back end server (e.g., application service 130) may store and reduce data, and push alerts to farmers. Generally, in one embodiment, the system 100 allows the crop scouting inspection process to be automated, which decreases task difficulty and allows an unskilled person operating a hands-free device to conduct the inspection. According to one embodiment, this functionality may be enhanced by capturing a video of an uprooted plant being inspected and image processing techniques are employed by a smart phone or tablet to pull out data about the crop from the video with little or no input required from the user 108.

In one example of crop scouting, a user 108 is inspecting a cotton plant, using the agrarian data management system 100 and a hands-free device. The first step, generally, involves finding and counting the nodes between the root structure and the first flowering branch. As will be appreciated by one having ordinary skill in the art, while node counting is one part of one task for inspecting one type of plant, the techniques used in the following example may be modified and tuned to work for a variety of different objectives. In one embodiment, the process for finding the number of visible cotton nodes in a single frame from a video employs techniques of image analysis. Generally, in various embodiments, the system 100 may analyze multiple frames to track and confirm critical points and help reduce false positive noise. In various embodiments, the steps in node detection may be performed by the processor 140 from FIG. 5.

In another embodiment, a voice-interaction system is provided which enables mobile workers to capture measurements, observations and complete inspections using their voice as they move about, leaving one or both hands and eyes free to safely and effectively focus on work tasks. The system has the flexibility to recognize highly specialized vocabulary, prompting for and error-checking utterances that are unique to an industry, company, government agency, user or specific task. This data is saved and formatted to be viewed, listened to, or input into a structured database for further use.

FIG. 8 illustrates an example block diagram of such a system 800 in an example embodiment. System 800 includes a processor 802, which may be a processor of a mobile device 114 or of a remote system server in communication with the mobile device 114. A dialog manager may be executed on the processor 802, as will be discussed in detail below. However, various functions may be performed locally on the processor 802, remotely on the server, or may be distributed between the two. A template 804, in communication with the processor 802, includes a data capture template 806, a voice interaction template 808, auto-fill information 810, and a local command list 812. Various unique templates 804 may be created to meet the needs of a customer. Customer data 114 stored in an electronic memory is also accessible by the processor 802, as well as global/default interaction parameters and command lists.

System 800 also includes an automatic speech recognition engine 818, which is in communication with at least one content-specific grammar model 820. The speech recognition engine 818 may comprise multiple subunits of speech recognition engines, each in communication with one or more different grammar models 820. For example, a first grammar model 820 with a limited set of words and phrases (e.g., just integers) may be in communication with a first speech recognition engine subunit. A second grammar model 820 with a more expansive set of words and phrases may be in communication with a second speech recognition subunit.

When a worker speaks, the dialog manager may transmit the recorded audio to a specific speech recognition subunit based on the expected type of response from the data capture template 806. For example, if an integer is expected, the dialog manager may transmit the audio to the first speech recognition subunit, because the more limited grammar model 820 associated with this subunit may lead to higher accuracy speech recognition. Alternatively, if a more free-form response is expected, the dialog manager may transmit the audio to the second speech recognition subunit. Varying numbers of subunits may be used with differing access to grammar models to achieve more accurate recognition.

The speech recognition engine 818 provides a list of the "n" most likely candidates for the worker's response based on the audio, along with respective confidence scores, as is known in the art. A natural language processing engine 822 is also in communication with the processor 802. Results from the speech recognition engine 818 may be passed to the natural language processing engine 822 for further recognition where the worker uses a more natural language approach to data entry.

The dialog manager utilizes the confidence scores to determine how to proceed with a worker's response. In an example embodiment, where the confidence score for a possible result is above an upper threshold, the dialog manager accepts the possible result. Where the confidence score is below a lower threshold, the dialog manager rejects the possible result. However, where the confidence score is between the upper and lower thresholds, the dialog manager seeks confirmation from the worker by playing back the possible result to the worker. If the worker affirmatively acknowledges, or if the worker simply proceeds with speaking further data to input, the dialog manager accepts the result. If the worker affirmatively rejects the possible result or if the worker re-speaks the input field name with data, the dialog manager rejects the original possible result and works with the new audio file.

In another embodiment, only a single confidence threshold is used. Where the confidence level is below the threshold, the dialog manager rejects the possible result. Where the confidence level is above the threshold, the dialog manager reads back the possible result to the worker for confirmation or rejection, as above. As the worker interacts with the system the dialog manager can analyze success or failure rates of speech recognition unit 818 and/or natural language processing engine 822 via the use of metadata. Based on this analysis, the threshold(s) can be changed, or grammar models 820 can be updated, or the like. As a non-limiting example, if a low success rate is detected, the (lower) threshold may be lowered to result in more user confirmations. Alternatively, the dialog manager may track responses using the metadata for a given input field, and may monitor for future responses for that input field which are a predetermined number of standard deviations away from the norm. For such outliers, the dialog manager can initiate a read back requesting user confirmation, even where a high confidence value is obtained.

The processor 802 may thus also have access to text-to-speech functionality. Processor 802 may also have access to various sensors and tools 826 associated with the mobile device 114 or otherwise. For example, sensors 826 may include audio mics, speakers, photographic or video cameras, GPS, or the like. Processor 802 may also include or be in communication with a voice activity detector or voice-operated switch 830 that is used to detect when the worker is speaking. Voice activity detector 830 may filter out background noise, by sampling background noise and provide the dialog manager with information regarding the level of ambient noise. This information may be used to modify the confidence threshold values. Once the system 800 has received any requested information, the processor 802 can generate an output of completed data 828.

An example data capture template 806 is shown in FIG. 9. As shown, the data capture template 806 may be a table of rows and columns. Generally, a data capture template 806 may begin with a column of input field names 905, into which a user can enter the names of the input fields into which data will later be added. For example, in FIG. 9 the template 806 is directed to a strawberry patch. Input field names may therefore include "fruit size," "fruit shape," "fruit color," etc. It will be noted that these input field names are merely non-limiting examples, as is the use of a strawberry field template.

The user may then choose other columns to add, so as to further refine the type of data that can be inputted and associated with the input fields. For example, in FIG. 9, a units column 910, a grammar recognizer column 915, and a range column 920 have been added. As a non-limiting example, a user may use the units column 910 to define that numbers input into a given field will be in centimeters, or inches, or the like. As shown in FIG. 9, a "rating" unit may be chosen, where a 1-9 rating is used. The grammar recognizer column 915 may be used to identify a grammar model 820 to be used. Each grammar model 820 includes a specific subset of words and phrases, appropriate for the template 806, from which an expected answer could be drawn. As a non-limiting example, certain input fields in FIG. 9 are associated with an "integer" grammar set, because those specific input fields should receive a numerical input. Others in column 915 point to a grammar set called "straw1" or "straw2," which would generally contain words and phrases specific to strawberry growing. Other non-agricultural grammar models 820 could also be used for non-agicultural fields. Column 920 allows the user to define an acceptable range of values for the answer.

Other example columns may be added to guide the eventual data input. For example, columns 925 and 930 relate to short and long prompts, respectively. As will be discussed below, the system may prompt a user for a certain input. Columns 925 and 930 allow the user to determine how the system will verbally prompt a worker, in either a long or short form. Similarly, columns 935 and 940 relate to high and low outlier triggers. Even if an eventual input is within the acceptable range defined in column 920, some inputs are considered "outliers." As a non-limiting example, even within an acceptable number range from 1-9, a 1 or a 9 may be unusual. Columns 935 and 940 allow the user to specifically denote unusual (although acceptable) answers, which will cause the system to confirm the input with the user.

Yet other optional columns may allow the user to define how the system progresses through the data input phrase. With columns 945 and 955, respectively, the user can define whether a specific input field may be skipped, and whether a specific input field requires an input at all. Column 950 allows the user to define whether a specific input in one field causes other input fields to be skipped. As a non-limiting example, if an input field asks whether a plant is alive, and if the answer is "no," further questions regarding that plant can be skipped.

Figure 10A:
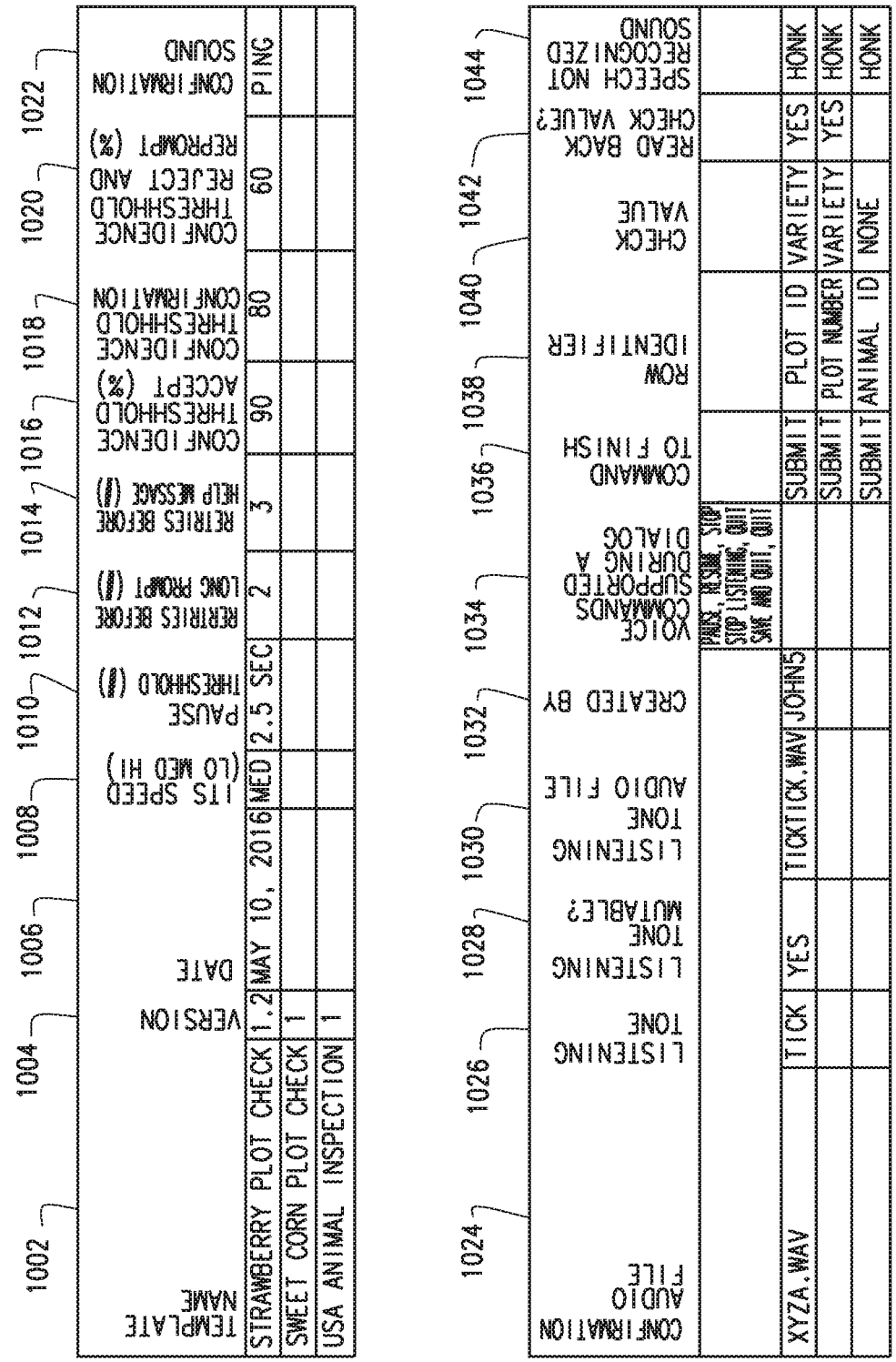

FIGS. 10A and 10B example and non-limiting voice interaction template 808 that defines dialogue parameters for a given data capture template 806. Column 1002 contains the name of the data capture template 806 to which the remaining entries in the row will apply. For example, in FIGS. 10A and 10B, the data capture template name "Strawberry Plot Check" is the name of the data capture template 806 in FIG. 9. Example columns include: version number (1004); date (1006); text-to-speech speed low-medium-high (1008) which determines read back speed; pause threshold (1010) which defines how long the system will pause; retries before long prompt (1012), which defines how many times the system will accept an invalid input before reprompting with the long reprompt from 930 above; retries before help message (1014); confidence threshold: accept (1016), which defines the confidence level at which an input is accepted; confidence threshold: confirmation required (1018), which defines the confidence level at which an input is likely understood, but requires a read-back to the worker for confirmation; confidence threshold: reject and reprompt (1020); confirmation sound (1022); confirmation audio file (1024); listening tone (1026): listening tone mutable (1028); listening tone audio file (1030); created by (1032); supported voice commands (1034); command to finish (1036); row identifier (1038); check value (1040); read-back check value (1042); speech not recognized sound (1044); speech not recognized; audio file (1046); primary language (1048); secondary language (1050): header info source (1052); and header cell names, in order, pulled from database (1054). The voice interaction template 808 is therefore closely linked to the data capturing template 806.

In operation, an outdoor technical professional or trade worker will have a smartphone or other mobile device 114 and may be wearing an optional wired or wireless headset 112. These devices communicate wirelessly with a main "cloud" computer system on which runs other processing and data storage elements discussed in connection with this embodiment. After turning on the system, the worker selects a checklist or task to be done, which is associated with a template such as the one discussed above. Guidance appears on the screen identifying the task or checklist to prompt the worker. In some embodiments, the worker can provide inputs in response to system prompts. However, in other embodiments, the worker may speak observations in a more free-form manner. In such embodiments, the worker may speak the observations in an order different from the order in the template. The system determines what the worker says, and the which columns of the template the answers relate to.

Figure 11B:
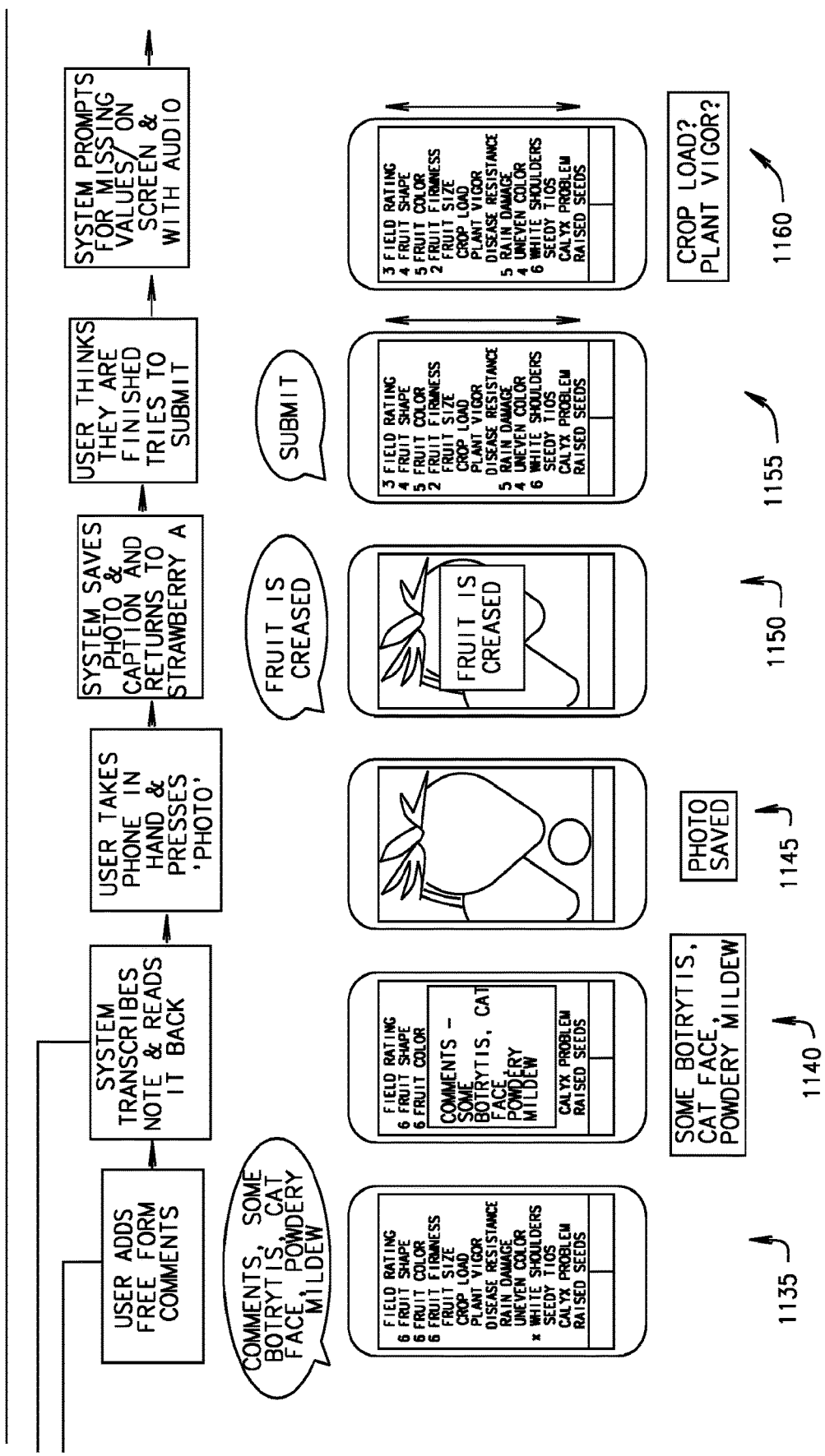
Figure 11C:
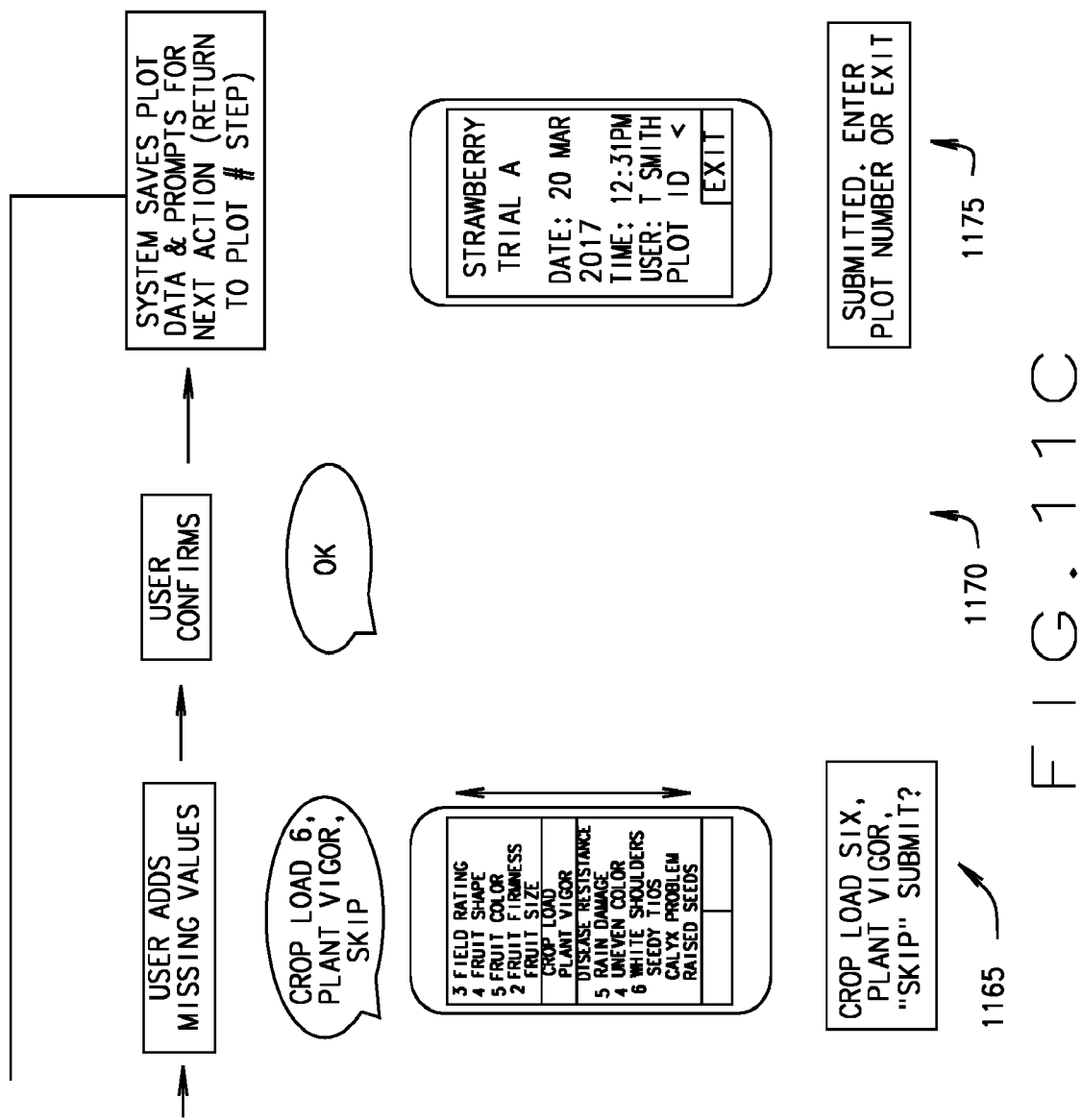

An example process from a worker's perspective is illustrated in FIGS. 11A-11C. In FIG. 11A, at step 1105, the worker is presented with one or more data capture templates 806 to choose from. In this instance, the worker selects "Strawberry A," which is associated with the data capture template 806 in FIG. 9 above. The system may confirm this selection verbally and/or on the screen. At step 1110, the worker's app accesses the template 806 either stored in local memory or wirelessly from system servers. Such system servers may themselves communicate with a specific client company's databases to access such information, as shown in FIG. 11A. Several pieces of data may auto-populate (from auto-fill information 810), such as date, time, worker, etc. Other information may be requested from the worker, either via verbal prompt or on the screen, or both. For example, in FIG. 11A, the plot number is requested. At step 1115, the worker speaks or otherwise inputs the plot number, and the system may confirm the plot number by speaking it back to the worker. Once confirmed either vocally or by tapping the screen, the system again auto-populates various fields with information associated with the selected plot from customer data 814 and/or other sources.

At step 1120, the worker is provided with a list of fields. The worker can physically select a field to fill, or may simply speak the input field name. Alternatively, the system may begin prompting the worker with an input field name. In yet another alternative embodiment, the worker may begin speaking in a more natural language manner. The worker's statements are transcribed and run through the natural language processing engine 822 to parse out the input field names and associated data. In any case, the worker speaks or otherwise enters information at step 1125, and enters binary values at step 1130. The system may confirm the worker's inputs on the screen or verbally, or both. Moving to FIG. 11B, the worker may also input freeform comments at step 1135. At step 1140, the system/app transcribes any such freeform comments, and may either verbally read them back to the worker or display the transcription on the screen, or both. Verbal read-backs utilize the text to speech 824 functionality, mentioned above. Photos may also be used to input information. For example, at step 1145, the worker may use a mobile phone or other mobile device to take a photograph, and at step 1150 may include comments for the photograph in the same manner as above.

Once the worker believes that the data input is complete, the worker may try to submit the data at step 1155. If incomplete, the system may prompt the worker for required information that is missing at step 1160. Continuing in FIG. 11C, at step 1165, the worker inputs the required information, and confirms at step 1170. Once the actually complete, at step 1175 the system/app saves the data and prompts for a next action, reverting back to step 1110. An example result is shown in FIG. 12, in which the various fields have been given appropriate values.

Specifically, as the worker begins speaking his observations, the system recognizes and checks the words provided against the various requirements in the data capture template, discussed above. As the worker's utterances are captured, they are passed to the automatic speech recognizer engine 818 which compares the utterances to the grammar model 820 listed in the data capture template 806. In some embodiments, the recognizer 818 will return the list of n-best matches and a confidence level back to the system. These will be used to determine the next steps in the user interaction, based on the voice interaction template 808. For example, after receiving a voice input, if there are no best matches, the system may once use a short reprompt (e.g., "Plant height?"). If there are matches but the confidence level for the highest-rated match is below the listed low threshold, the system may play the "unrecognized" tone and use a short reprompt. If the confidence level for the highest match is above the low threshold but below a high threshold, the system may repeat the worker's perceived response (e.g., "twenty-seven?") and listen for a response (e.g., "yes," or "no" followed by a response from the expected grammar set, such as "twenty-five"). Multiple failed attempts above a desired number may trigger a more detailed reprompt, such as a long reprompt. If that fails to elicit an acceptable response, the system may recite a help message.

However, if the confidence level for the highest match is above a high threshold, the systems may check the returned value against the listed range and thresholds. As a non-limiting example, if the value is outside the range, the system may reprompt. Optionally, the system may reprompt with a cell name and/or range statement (e.g., "Plant height, zero to twenty-five centimeters"). If the value is within the listed range, but is an outlier value (and thus rarely seen), the system may repeat the response to the worker, requesting confirmation (e.g., "twenty-seven, yes?") and listen to the response. If the value is within the selected range and not an outlier, the system may provide feedback in the form of one or more of a tone, vibration, on-screen indication, and/or an audio repetition of the accepted value for confirmation and proceeds to the next cell.

This is the behavior of a successfully completed value capture. In a good interaction, this path would be repeated over and over until the task is completed. All other paths are confirmation or error-handling paths, only used when a potential problem or uncertainty is detected. These error conditions (where attributable to recognition errors) may be saved and flagged. The data can be examined by a developer, and in a manual or automated process be used, for example, to reset confidence level thresholds up or down appropriately to optimize error-handling. Alternatively, such data could be used to assemble the voice files of low-confidence utterances with their worker-confirmed meanings for analysis and addition to the grammar, language model, or acoustic model. Still further, such data could be used to flag persistent problems for trouble-shooting by developers.

Individual cells may also be set to accept free-form text. This text would be transcribed from a full language model, and may or may not be subject to the confirmation checks. As a check-step, this transcribed text can be read back in its entirety to the worker, who would then delete, accept, or add to it.

The above discussed error-handling method has two advantages. First, it trains the worker in the behavior of the system, and the accepted values. Second, it also trains the system. The worker provides confirmation or correction of marginally recognized voice files which then are fed back into the language model. This loop, in concert with machine learning, is used to increase the effectiveness and accuracy of the system over time. The responses provided by the system to the worker may include audio tones, simulated human voice, haptic feedback such as clicks and vibrations, in both the phone and headset, alone or in combination to improving the effectiveness of the human-to-system interaction.

Figure 13:
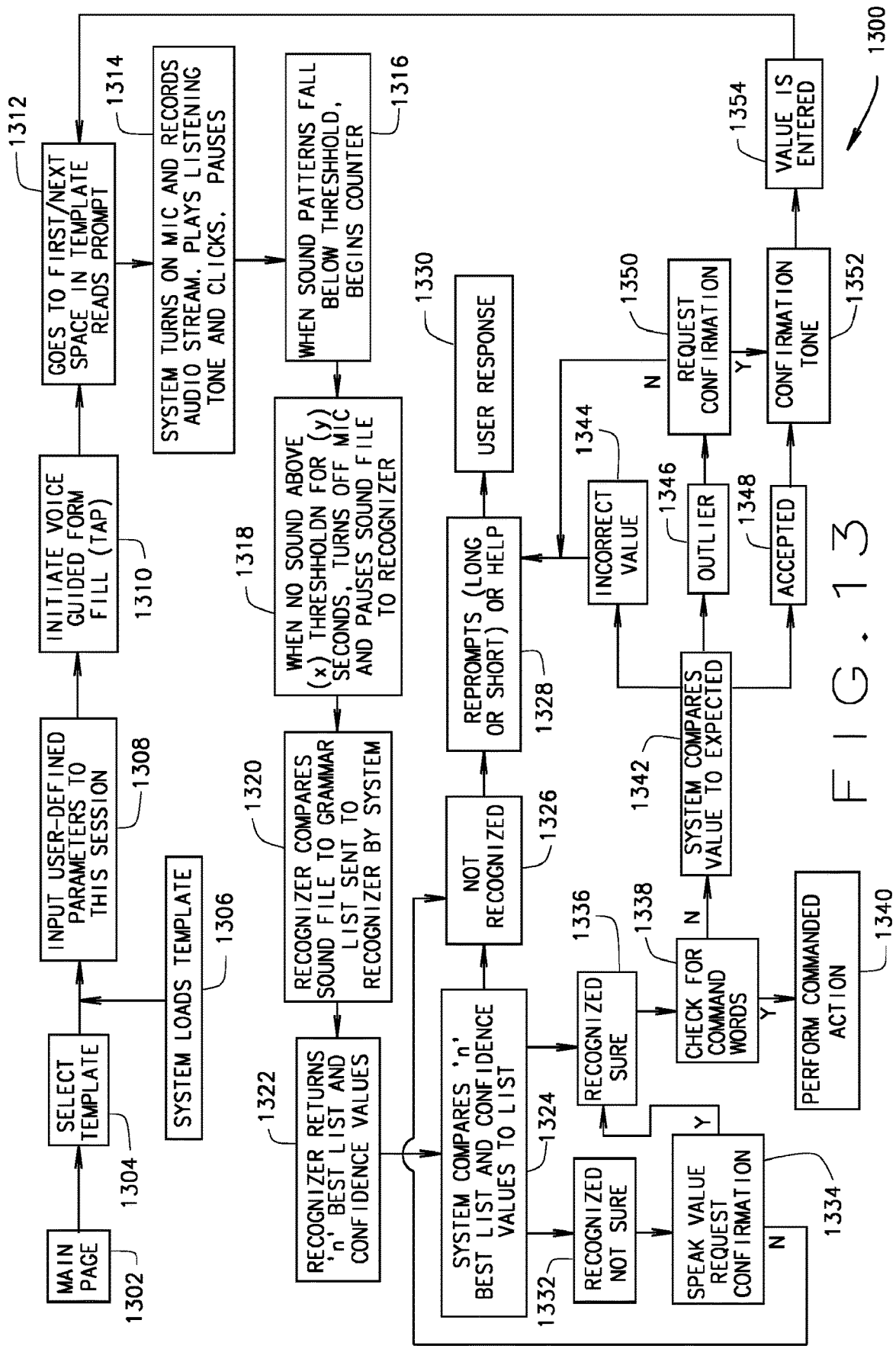
FIG. 13 illustrates an example flow diagram of a process for voice activated data collection according to an example embodiment.

FIG. 13 illustrates an example embodiment 1300 of functionality of the system/app. At step 1302, as discussed above, the worker's app starts with a main page, and the worker selects a data capture template 806 at step 1304. At step 1306, the system loads the selected data capture template 806, either from a central server or from local memory in the worker's device. At step 1308, the app loads the user defined parameters from the data capture template 806 into the current session. At step 1310, a voice-guided form fill sequence is initiated, either by the worker taping the screen (or otherwise instructing the mobile device to begin), or by the system itself.

At step 1312, the system goes to the first (or next, on subsequent runs) space in the data capture template 806, and prompts the worker. As noted previously, the worker may not need prompts, and may alternatively speak the input field names and/or input through a more natural language approach. After prompting the worker at step 1312, the system turns on a mic 826 and records an audio stream at step 1314. A listening tone is played for the worker, and the system pauses for a response. At step 1316, when the detected sound pattern falls below a threshold, a counter begins. At step 1318, when no sound is detected above a threshold (x) for (y) seconds, the mic 826 is turned off and the sound file is passed to the automatic speech recognition engine 818. At step 1320, the recognition engine 818 compares the sound file to a selected grammar model 820, and at step 1322, the recognition engine 818 returns a list of the "n" best possible matches and their confidence values. At step 1324, the system reviews the confidence levels. At step 1326, if the confidence levels fall below a lower threshold, the utterance is not recognized and at step 1328, the worker is reprompted. When the worker responds at step 1330, the process reverts back to step 1320 where the recognition engine again attempts to determine what the worker said.

However, at step 1332, if the confidence level is above the lower threshold but below an upper threshold, the system is unsure. At step 1334, the system reads back the possible input to the worker via text-to-speech functionality 824, and awaits the worker's response. If the worker responds in the negative, the system reverts to step 1326 (discussed above) where the system did not recognize the utterance, and proceeds from there. However, if the worker confirms the system's determination at step 1334, or if the confidence value is above the upper threshold at step 1324, the system advances to step 1336 in which the utterance has been recognized. At step 1338, the system checks to see if any command words were present. If so, at step 1340, the appropriate command is executed.

If not, at step 1342, the system compares the received information to the range of acceptable values 920. If an unacceptable value at step 1344, the system reverts to step 1328 and reprompts. Otherwise, the value is an outlier at step 1346, or is accepted at step 1348. If the value is an outlier at step 1346, the system reads back the response to the worker for confirmation (if not already done previously) at step 1350. If the worker response negatively, the system again reverts to step 1328 and reprompts. If the read-back is confirmed at step 1350, or if the value was accepted at step 1348, the system plays a confirmation tone 1352 and the value is entered at step 1354. The process then reverts back to step 1312 for the next input field.

As noted above, the worker may speak the input field name 905 and value pairs in a free-form manner, listing parameters and their values in any order. Filler words or alternate phrasings may also be spoken. The system takes this audio stream, and extracts the input field names and values, and assembles them into the appropriate fields. This is accomplished by passing the transcribed text file to the natural language processing engine which performs entity extraction based on a template or prior instructions. The system may then recite or display the cell contents for the user to confirm or correct. This free-form method may be more natural and faster for the user.

Thus, in an example embodiment, the system is at times worker-initiated but at times is system-driven. It may passively listen for the worker's utterance, and then performs recognition and entity extraction to fill the indicated fields. At other times, the system guides the worker. The system can prompt the worker based on templated, pre-set or pre-scheduled notifications. For example, the system can prompt for an inspection for quarterly filings, inventory, or regulatory certification. As another example, the system can prompt when crossing a geofence, or reaching proximity to a work site. The worker may be prompted to complete unfinished, or scheduled actions or data-collection activities associated with that location.

In some use cases, there are binary values to be captured. For example, in a simple checklist, each item may either be present or not. The system handles these by having a preset list of the binary values, and upon recognizing that the worker has spoken one, putting a check next to it in the screen. The system may repeating the input field name (e.g. "weak plants"). The worker can "un-check" the binary values manually on-screen or by saying, "No <celname>" or "Cancel <celname>" or the like.

In another example of system-driven interaction, when the worker tries to finalize the task, or requests system assistance in completion, the system checks for unfilled yet required fields in the template. The system may prompt the worker through to completion.

A section may be present in which the worker may add parenthetical comments about the client, task, environment, or personal reminders. These "private notes" would be viewable and retrievable by the initiator, but not be part of the formatted report designed for distribution to their clients or intended recipient. These side notes can be linked to a CRM (customer relationship management) system to aid in sales transactions.

Meta-data documenting the field inspection process can also be used to make reports, highlight trends, perform structured queries, and detect and graph patterns. For example, a map can show all points where the name of a specific insect is spoken, correlated with time of year. The paths travelled, miles travelled and average time per plot of each inspector can be charted.

A web-based template authoring system may facilitate the customization of a template from a generic baseline template with suggestions and selections for each cell's parametric information. A wizard-type interface can lead inexperienced users step by step through the template authoring process by presenting questions one at a time. Similarly, an output template depicts the layout and overall content of each report. This "blank" report template would then be populated with user-entered and automated data elements with design elements like logos, colors and fonts as specified or selected by users.

The system may produce a variety of outputs, such as a CSV or spreadsheet format suitable for input to a customer's database containing the values collected for the cells; a print-ready PDF of the completed form with title block, headings and the table of captured values, transcribed notes and photos, captions; an activity log listing any error-handling paths and voice files of confirmed and corrected words; any alerts or warnings triggered by thresholds set in the templates; audio files, tagged with time stamp and location data are saved on the mobile device and cloud database for retrieval by the initiator or other interested users; and an audio report.

The system may also employ machine learning for continuous improvement. An activity log contains data useful in fine-tuning the system. A capture of a worker's utterance paired with its confirmed word or phrase transcription can be added to a grammar/language model 820 with the confidence value, or threshold correspondingly increased for future instances of similar utterances. The system may detect the proportion of worker-rejected answers, and dynamically either increase or decrease the confidence level thresholds to reach an optimum level. Analysis of these files would let developers monitor and set a balance between throughput and accuracy and provide a worker-controllable or automated setting. Further, analysis of the activity log of worker and system behavior in the interaction may be used to get a true picture of the end-to-end experience and its effectiveness at completing the task. The number of corrections or repetitions, elapsed time for full plot inspection cycle, average or specific confidence levels in recognition, can be derived from the data set as desired.

In addition to the real-time error checking above, the worker can edit the output reports prior to saving or sending. The worker can ensure clean, accurate data without the cost of third-party human editing. The system saves the log file of the corrective actions and feeds them back into the system to enhance the future accuracy via machine learning.

The voice recognition engine(s) may be in the cloud, requiring real-time data connection for the voice recognition, or may be embedded in the smartphone or mobile device to work in areas of weak or no signal. When adequate data signal is present, the system may synch the on-device elements with the cloud, and upload new machine-learning inputs to enhance the system accuracy.

The activity flow and voice data be in a format that permits analytics so as to identify trends and correlations and to make comparisons and predictions. This may be in the form of ongoing metrics displayed on a "dashboard," e.g. weekly tallies of number of fields scouted, reports created, minutes of voice data captured, or miles covered. In addition, custom queries can be initiated manually one-by-one (e.g., "display a scatter plot on a map of Missouri showing each time the phrase "Japanese beetle" was uttered in the month of June 2015.") These analytics may produce a charted output in the form of printed paper documents, or digital PDF files which can be retrieved from multiple devices including personal computers, tablet and phones.

The user, worker, and/or system administrator may set up notifications. Notifications may be triggered by exceeding specific thresholds of input values, or upon detection of specific words (e.g., "dangerous"), the number or proportion of errors/corrections/unrecognized utterances in the interaction, or other parameters. Notifications may be sent to the user, worker, or a supervisor or administrator other persons or systems by text, or email or other means From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), a personal area network (PAN), virtual networks (WAN, LAN, or PAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

We claim:

1. A method for extracting data from voice-interactive inspections gathered by mobile workers to populate a predetermined inspection template, the method comprising the steps of:
   creating a template of data fields for data to be collected, the template including control parameters controlling a voice interaction sequence with a worker and conformity and accuracy parameters for error checking;
   executing, via a processor of a mobile device, a guided voice-interaction with the worker based on the template and at least the control parameters;
   transcribing utterances made by the worker, in response to the guided voice-interaction, to an electronic text file via a speech recognition engine of the processor;
   storing the electronic text file in an electronic database;
   extracting, from the electronic text file, data values corresponding to the data fields in the template;
   verifying conformity and accuracy of said data values by comparing said data values to said conformity parameters and said accuracy parameters;
   prompting the worker for confirmation of a respective one of the data values when at least one of the conformity and accuracy parameters for the respective one of the data values are below a threshold;
   generating a record containing the data values collected, the record including the data values combined with metadata about a location where the data values were collected, a time when the data values were collected, and interactions with the worker when collecting the data values;
   using the metadata to identify a first number of user-corrected words, a second number of unknown words, and a third number of verified words;
   calculating a total number and a ratio between total number and the third number of verified words to analyze a performance quality of the transcribing step, wherein the total number comprises a sum of the first number of user-corrected words and the second number of unknown words; and
   when at least one of the total number and the ratio is above a threshold value, triggering a reset of a local interaction parameter.

2. The method of claim 1 further including the step of performing natural language processing on the electronic text file via a natural language processing engine of the processor.

3. The method of claim 1 wherein the speech recognition engine is embodied in the processor of the mobile device.

4. The method of claim 1 wherein the template is selected automatically upon detection that the worker is within a pre-specified geofenced area.

5. The method of claim 1 wherein at least some of the data values are input by a sensor in communication with the mobile device other than an audio sensor.

6. The method of claim 1 wherein the record is encrypted.

7. The method of claim 1 wherein the data values include photographic or video files.

8. The method of claim 1 further including the step of creating a report using the metadata.

9. The method of claim 8 wherein the report includes at least one of: a fourth number of words spoken by the worker, the first number of user corrected words, a number of miles travelled by the worker per day, and an average minutes per plot inspected.

10. The method of claim 1, wherein the reset of the local interaction parameter includes modifying a threshold at which the worker is prompted to confirm one or more of the data values.

11. The method of claim 1 wherein a fully spoken word or phrase by a worker is recorded as an abbreviation for the word or phrase based on a lookup table.

12. The method of claim 11 wherein the worker selects whether, upon read back, the word or phrase is read back, or the abbreviation is read back for user confirmation.

13. The method of claim 1 wherein a graphical report is generated in a predetermined format.

14. The method of claim 13 wherein the predetermined format is at least one of a PDF, beg, or .doc.

15. The method of claim 1 wherein an audio report is generated.

16. The method of claim 1 wherein a worker's utterance includes a command word or phrase, which upon confirmation of accuracy triggers an action.

17. The method of claim 1 wherein additional data is detected via one or more sensors associated with the mobile device, and a notification is generated when the system detects the occurrence of a pre-identified action.

18. The method of claim 17 wherein the pre-identified action includes when the worker enters or leaves a geofenced area.

19. The method of claim 17 wherein the one or more sensors includes a location sensor, and location detection is used to calculate a velocity at which the worker is moving.

20. The method of claim 17 wherein the one of more sensors includes a location sensor, and wherein the guided voice interaction includes audio cues and simulated voice instructions to a predetermined point inside an agricultural interest zone.

21. The method of claim 1 wherein the conformity parameters include historic data for a given input, and wherein a determination of potential non-conformity occurs when a piece of collected data is outside a predetermined number of standard deviations from historical data for the given input.

22. The method of claim 1 wherein the mobile device includes a continuously refreshing buffer of a predetermined number of seconds of audio.

23. The method of claim 22 wherein at least one of a voice activity detector and a voice-operated switch is used as a filter on sound from a microphone of the mobile device.

24. The method of claim 23 wherein upon detection of a voice by the voice activity detector or voice-operated switch, the audio in the buffer and subsequent real-time audio for a predetermined number of seconds after speech is no longer detected are streamed to the speech recognition engine.

25. The method of claim 1 wherein the speech recognition engine includes multiple speech recognition sub-engines.

26. The method of claim 23 wherein ambient sound is sampled and compared to a pattern or threshold to create a predetermined threshold for a likelihood of good recognition.

27. The method of claim 26 wherein a low threshold for a likelihood of good recognition triggers a modification to a minimum confidence value for accepting a data value.

28. The method of claim 1 wherein data received from the worker includes at least one trigger value that modifies a set of required data.

29. The method of claim 1 wherein data received from the worker includes at least one trigger value that initiates a conditional path of the guided voice-interaction.

30. The method of claim 1 wherein begin and endpoints of an audio file are triggered by the worker on the mobile device.

31. The method of claim 1 wherein in response to being prompted for confirmation, the worker confirms by speaking a subsequent unrelated piece of data.

32. The method of claim 1 wherein additional data is detected via one or more location sensors associated with the mobile device, wherein upon detection of a location within a preselected geofenced area via the one or more location sensors initiates a conditional path of the guided voice-interaction.

* * * * *

UNITED STATES PATENT AND TRADEMARK OFFICE
CERTIFICATE OF CORRECTION

| | | |
|---|---|---|
| PATENT NO. | : 11,169,773 B2 | |
| APPLICATION NO. | : 16/317752 | |
| DATED | : November 9, 2021 | |
| INVENTOR(S) | : John David Swansey et al. | |

It is certified that error appears in the above-identified patent and that said Letters Patent is hereby corrected as shown below:

In the Specification

In Column 14, Line 60, delete "interact" and replace with -- internet --

In Column 21, Line 53, add the term -- illustrate -- before the term "example"

In Column 23, Line 49, add the term -- outlier -- before the term "thresholds"

In Column 26, Line 66, add the term -- may -- after the term "data"

Signed and Sealed this
Sixteenth Day of May, 2023

Katherine Kelly Vidal
*Director of the United States Patent and Trademark Office*